(12) United States Patent
Vickery et al.

(10) Patent No.: US 11,800,863 B2
(45) Date of Patent: Oct. 31, 2023

(54) RODENT TRAP WITH PRESENCE INDICATOR MECHANISM

(71) Applicant: VM Products, Inc., Colleyville, TX (US)

(72) Inventors: Ethan Vickery, Colleyville, TX (US); Jay Rasmussen, Colleyville, TX (US)

(73) Assignee: VM PRODUCTS, INC., Colleyville, TX (US)

( * ) Notice: Subject to any disclaimer, the term of this patent is extended or adjusted under 35 U.S.C. 154(b) by 456 days.

(21) Appl. No.: 15/975,361

(22) Filed: May 9, 2018

(65) Prior Publication Data

US 2018/0325095 A1 Nov. 15, 2018

Related U.S. Application Data

(60) Provisional application No. 62/504,279, filed on May 10, 2017.

(51) Int. Cl.
*A01M 23/24* (2006.01)
*A01M 23/30* (2006.01)
*A01M 23/08* (2006.01)

(52) U.S. Cl.
CPC .......... *A01M 23/245* (2013.01); *A01M 23/30* (2013.01); *A01M 23/08* (2013.01)

(58) Field of Classification Search
CPC ...... A01M 23/30; A01M 23/00; A01M 23/24; A01M 25/00; A01M 25/002; A01M 25/004
USPC ......................................... 43/81, 58, 88, 131
See application file for complete search history.

(56) References Cited

U.S. PATENT DOCUMENTS

| | | | |
|---|---|---|---|
| 524,894 A | 8/1894 | Forsberg | |
| 759,030 A | 5/1904 | Sheaffer | |
| 879,010 A * | 2/1908 | Schmitt | A01M 23/36 43/79 |
| RE14,782 E | 12/1919 | Hedrich et al. | |

(Continued)

FOREIGN PATENT DOCUMENTS

| | | |
|---|---|---|
| DE | 3140658 A1 | 4/1983 |
| DE | 10207916 C1 | 4/2003 |

(Continued)

OTHER PUBLICATIONS

"Protecta Mouse Bait Station Features," RTU Mouse Bait Stations, hap://www.rodentcontrols.com/mouse-bait-statiorts-rtu.htm, published Jun. 2004.

(Continued)

*Primary Examiner* — Darren W Ark
*Assistant Examiner* — Kevin M Dennis
(74) *Attorney, Agent, or Firm* — Norton Rose Fulbright US LLP

(57) ABSTRACT

Pest-management apparatuses and related methods. At least some of the present pest-management apparatuses comprise: a base, a lid coupled to the base such that the lid is movable between open and closed positions, where the base and lid define a chamber when the lid is in the closed position; a pest-capture device disposable within the chamber and having a capture element that is movable between set and capture positions; and an elongated indicator configured to extend through an opening in the lid when the lid is in the closed position.

17 Claims, 21 Drawing Sheets

(56) References Cited

U.S. PATENT DOCUMENTS

| | | | |
|---|---|---|---|
| 1,633,982 A * | 6/1927 | Davis | A01M 25/004 43/131 |
| 1,729,389 A | 9/1929 | Hughett | |
| 2,569,833 A | 10/1951 | Simpson | |
| 2,710,485 A | 6/1955 | Starr | |
| 2,736,127 A | 2/1956 | McCann | |
| 2,750,707 A | 6/1956 | Ekstedt | |
| 2,784,577 A | 3/1957 | Beaham | |
| 2,837,861 A | 6/1958 | Graham | |
| 2,896,361 A | 7/1959 | Allen | |
| 2,950,562 A | 8/1960 | Lothrop | |
| 2,953,868 A | 9/1960 | Chambers | |
| 3,271,894 A | 9/1966 | Manno et al. | |
| 3,303,600 A | 2/1967 | Freeman | |
| 3,318,039 A | 5/1967 | MacDonald et al. | |
| 3,319,373 A | 5/1967 | Gale et al. | |
| 3,343,744 A | 9/1967 | Morell et al. | |
| 3,427,743 A | 2/1969 | Brunner et al. | |
| 3,471,114 A | 10/1969 | Ball | |
| 3,488,879 A | 1/1970 | Laughlin | |
| 3,704,539 A | 12/1972 | Alvarez | |
| 3,708,905 A | 1/1973 | Jalbert | |
| D227,563 S | 7/1973 | Torchia | |
| 3,778,923 A * | 12/1973 | Cuoco | A01M 23/04 43/69 |
| 3,821,861 A | 7/1974 | Jalbert | |
| 3,978,607 A | 9/1976 | Piere | |
| 3,992,803 A * | 11/1976 | Kaiser | A01M 23/30 43/83 |
| 3,992,804 A | 11/1976 | Senese | |
| 4,026,064 A | 5/1977 | Baker | |
| 4,030,230 A | 6/1977 | Souza | |
| 4,182,070 A | 1/1980 | Connelly | |
| 4,208,829 A | 6/1980 | Manning | |
| 4,216,606 A * | 8/1980 | Kaiser | A01M 23/30 43/83 |
| 4,216,640 A | 8/1980 | Kaufman | |
| 4,226,042 A | 10/1980 | Gilbert | |
| D258,751 S | 3/1981 | Lindley | |
| 4,270,299 A | 6/1981 | Long | |
| 4,277,907 A | 7/1981 | Ernest | |
| 4,328,637 A | 5/1982 | Eichmuller et al. | |
| 4,349,982 A | 9/1982 | Sherman | |
| 4,387,552 A | 6/1983 | Lancaster | |
| 4,393,616 A * | 7/1983 | Kaufman | A01M 23/18 43/60 |
| 4,398,643 A | 8/1983 | Conlon | |
| 4,400,904 A | 8/1983 | Baker | |
| 4,407,427 A | 10/1983 | Reuter | |
| D271,231 S | 11/1983 | Stout | |
| 4,413,439 A * | 11/1983 | Lindley | A01M 23/20 43/61 |
| 4,418,493 A | 12/1983 | Jordan | |
| 4,438,606 A | 3/1984 | Chardon et al. | |
| 4,453,337 A | 6/1984 | Williams | |
| 4,485,582 A | 12/1984 | Morris | |
| 4,486,973 A | 12/1984 | Faucillon | |
| 4,517,557 A * | 5/1985 | Agron | A01M 23/30 340/540 |
| 4,521,987 A | 6/1985 | Knote | |
| 4,541,198 A | 9/1985 | Sherman | |
| D281,231 S | 11/1985 | Cochran | |
| 4,570,377 A | 2/1986 | Primavera | |
| 4,574,519 A | 3/1986 | Eckebrecht | |
| 4,611,426 A | 9/1986 | Willis | |
| 4,619,071 A | 10/1986 | Willis | |
| 4,648,201 A | 3/1987 | Sherman | |
| 4,660,320 A | 4/1987 | Baker | |
| 4,730,411 A | 3/1988 | Katis | |
| 4,753,032 A | 6/1988 | Sherman | |
| 4,765,579 A | 8/1988 | Robbins, III et al. | |
| 4,833,819 A | 5/1989 | Sherman | |
| 4,835,902 A | 6/1989 | Sherman | |
| 4,870,780 A * | 10/1989 | Sherman | A01M 25/004 43/131 |
| 4,872,582 A | 10/1989 | Sipple | |
| 4,874,103 A | 10/1989 | Quisenberry et al. | |
| 4,878,792 A * | 11/1989 | Frano | F16B 35/06 24/615 |
| 4,905,407 A | 3/1990 | Sherman | |
| 5,004,114 A | 4/1991 | Terbrusch et al. | |
| 5,014,943 A | 5/1991 | Nelson et al. | |
| 5,038,516 A | 8/1991 | Doucette | |
| 5,040,327 A | 8/1991 | Stack et al. | |
| 5,085,030 A | 2/1992 | Segawa et al. | |
| 5,105,972 A | 4/1992 | Waterston et al. | |
| 5,131,184 A | 7/1992 | Harrison | |
| 5,136,803 A | 8/1992 | Sykes et al. | |
| 5,148,624 A * | 9/1992 | Schmidt | A01M 23/30 43/81 |
| 5,150,810 A | 9/1992 | Loebbert | |
| 5,152,420 A | 10/1992 | Bird et al. | |
| 5,174,462 A | 12/1992 | Hames | |
| 5,184,836 A | 2/1993 | Andrews, Jr. et al. | |
| 5,267,411 A * | 12/1993 | Phillips | A01M 23/30 43/81 |
| 5,272,832 A | 12/1993 | Marshall et al. | |
| 5,295,607 A | 3/1994 | Chang | |
| D354,690 S | 1/1995 | Butler et al. | |
| 5,379,545 A | 1/1995 | Gall | |
| 5,385,258 A | 1/1995 | Sutherlin | |
| 5,405,041 A | 4/1995 | Van Brackle | |
| 5,419,453 A | 5/1995 | Lochridge | |
| 5,446,992 A | 9/1995 | Stewart | |
| 5,448,852 A | 9/1995 | Spragins et al. | |
| 5,458,259 A | 10/1995 | Falk | |
| 5,477,635 A * | 12/1995 | Orsano | A01M 23/30 43/81 |
| 5,503,292 A | 4/1996 | Cucchiara | |
| D374,704 S | 10/1996 | Rimback | |
| 5,775,859 A * | 7/1998 | Anscher | F16B 5/065 411/509 |
| 5,806,237 A | 9/1998 | Nelson et al. | |
| 6,266,918 B1 * | 7/2001 | Henderson | A01M 1/026 43/124 |
| 6,267,079 B1 | 7/2001 | Eby | |
| 6,397,517 B1 * | 6/2002 | Leyerle | A01M 23/24 43/131 |
| 6,651,378 B2 | 11/2003 | Baker | |
| D486,203 S | 2/2004 | Stephen | |
| 6,775,595 B1 | 8/2004 | Yabutani et al. | |
| 6,792,713 B2 | 9/2004 | Snell | |
| 6,807,768 B2 | 10/2004 | Johnson et al. | |
| D498,286 S | 11/2004 | Loerakker et al. | |
| 6,860,062 B2 | 3/2005 | Spragins | |
| 6,874,274 B2 | 4/2005 | Townsend | |
| 6,901,694 B1 | 6/2005 | Neault | |
| 6,910,300 B1 | 6/2005 | Warren | |
| 6,981,680 B1 | 1/2006 | Gordon et al. | |
| 7,026,942 B2 * | 4/2006 | Cristofori | A01M 23/04 340/384.2 |
| 7,165,353 B2 | 1/2007 | Matts et al. | |
| 7,165,354 B1 | 1/2007 | Rickenbacker | |
| 7,213,869 B1 | 5/2007 | McClellan | |
| 7,377,072 B2 | 5/2008 | Meier et al. | |
| 7,481,474 B2 * | 1/2009 | Higgins | F16B 21/086 24/297 |
| 7,513,476 B1 | 4/2009 | Huang | |
| 7,634,894 B2 | 12/2009 | Yohe et al. | |
| 7,647,723 B2 | 1/2010 | Klein et al. | |
| 7,669,363 B2 | 3/2010 | Frisch | |
| 7,735,258 B2 | 6/2010 | Vickery | |
| 7,784,216 B2 * | 8/2010 | Kaukeinen | A01M 25/004 43/131 |
| 7,793,460 B2 * | 9/2010 | Ha | A01M 23/18 43/61 |
| 7,861,865 B2 | 1/2011 | Green | |
| 7,874,098 B2 | 1/2011 | Vickery et al. | |
| 7,927,050 B2 * | 4/2011 | Koike | F16B 21/086 411/188 |

(56) References Cited

U.S. PATENT DOCUMENTS

| | | | |
|---|---|---|---|
| 8,104,222 B2* | 1/2012 | Hovey | A01M 23/30 43/83.5 |
| 8,122,567 B2* | 2/2012 | Connor, Jr. | B60N 3/046 24/297 |
| 8,209,900 B2 | 7/2012 | Vickery et al. | |
| 8,291,637 B2* | 10/2012 | Patterson | A01M 23/30 43/81 |
| 8,418,396 B2* | 4/2013 | Moustirats | A01M 31/002 43/61 |
| D686,689 S | 7/2013 | Bernard | |
| 8,585,121 B2* | 11/2013 | Marx | F16B 21/02 24/297 |
| 8,683,737 B2* | 4/2014 | Studer | A01M 23/08 43/61 |
| 8,701,594 B2 | 4/2014 | Vickery et al. | |
| D712,503 S | 9/2014 | Aiston | |
| D722,128 S | 2/2015 | Wang et al. | |
| 9,771,963 B2* | 9/2017 | Lepper | F16B 21/086 |
| D809,086 S | 1/2018 | Rodgers et al. | |
| D811,517 S | 2/2018 | Chapin et al. | |
| 9,938,997 B2* | 4/2018 | Iwahara | F16B 5/0664 |
| 9,982,694 B2* | 5/2018 | Scroggie | F16B 2/22 |
| 10,316,880 B2* | 6/2019 | Klein | B60R 13/0206 |
| 10,440,943 B2* | 10/2019 | Brown | A01M 19/00 |
| 10,821,914 B2* | 11/2020 | Benson | F16B 2/22 |
| 1,443,287 A1 | 1/2023 | Snyder et al. | |
| 2002/0167409 A1* | 11/2002 | Cristofori | A01M 23/08 340/573.2 |
| 2003/0110679 A1* | 6/2003 | Collins | A01M 23/36 43/81 |
| 2004/0016088 A1* | 1/2004 | Angellotti | F16B 5/065 24/297 |
| 2005/0132637 A1 | 6/2005 | Deakins | |
| 2005/0198893 A1 | 9/2005 | Bernard et al. | |
| 2008/0010895 A1* | 1/2008 | Kaukeinen | A01M 25/004 43/58 |
| 2009/0056199 A1* | 3/2009 | Reed | B29C 65/72 43/131 |
| 2009/0094884 A1 | 4/2009 | Cink | |
| 2009/0139133 A1 | 6/2009 | Harper | |
| 2009/0166235 A1 | 7/2009 | Månsson et al. | |
| 2009/0229170 A1 | 9/2009 | Gaibotti | |
| 2009/0307963 A1 | 12/2009 | Abbas | |
| 2010/0031557 A1 | 2/2010 | Vickery et al. | |
| 2010/0050498 A1 | 3/2010 | Nelson et al. | |
| 2010/0170141 A1 | 7/2010 | Cink et al. | |
| 2010/0251598 A1 | 10/2010 | Vickery et al. | |
| 2010/0313466 A1 | 12/2010 | Vickery | |
| 2010/0325940 A1 | 12/2010 | Pryor et al. | |
| 2011/0023350 A1* | 2/2011 | Hovey | A01M 23/08 43/81.5 |
| 2011/0072709 A1* | 3/2011 | Patterson | A01M 31/002 43/81 |
| 2011/0219666 A1 | 9/2011 | Vickery et al. | |
| 2012/0180378 A1* | 7/2012 | Studer | A01M 23/08 43/60 |
| 2013/0174470 A1* | 7/2013 | Vickery | A01M 25/004 43/124 |
| 2014/0071276 A1 | 3/2014 | Seifer et al. | |
| 2015/0033614 A1* | 2/2015 | Allbright, Jr. | A01M 23/18 43/60 |
| 2016/0129854 A1* | 5/2016 | Bachelder | B60R 13/0206 24/292 |
| 2017/0215407 A1* | 8/2017 | Pinzone | A01M 23/245 |
| 2017/0265452 A1* | 9/2017 | Leasure | A01M 23/26 |
| 2017/0354139 A1* | 12/2017 | Vickery | A01M 23/30 |
| 2018/0146657 A1* | 5/2018 | Reilly | A01M 23/24 |
| 2018/0184642 A1* | 7/2018 | Meissner | A01M 23/14 |

FOREIGN PATENT DOCUMENTS

| | | |
|---|---|---|
| EP | 442190 | 1/1994 |
| EP | 599755 A1 | 6/1994 |
| EP | 745323 | 12/1996 |
| EP | 1201124 A2 | 5/2002 |
| EP | 1234502 A2 | 8/2002 |
| EP | 1350430 | 10/2003 |
| EP | 1459625 | 9/2004 |
| EP | 2100504 A2 | 9/2009 |
| EP | 2100504 A3 | 9/2010 |
| FR | 2 268 464 | 12/1975 |
| FR | 2 331 281 | 7/1977 |
| FR | 2 398 454 | 3/1979 |
| FR | 2 855 720 | 12/2004 |
| GB | 2 249 249 | 5/1992 |
| GB | 2 269 306 | 2/1994 |
| GB | 2 3 84 966 | 8/2003 |
| JP | 2009159938 | 7/2009 |
| WO | WO 1998/010645 | 3/1998 |
| WO | WO 1999/003340 | 1/1999 |
| WO | WO 2001/037651 | 5/2001 |
| WO | WO 2002/013604 | 2/2002 |
| WO | WO 2002/102147 | 12/2002 |
| WO | WO 2003/009683 | 2/2003 |
| WO | WO 2003/045138 | 6/2003 |
| WO | WO 2004/084625 | 10/2004 |
| WO | WO 2005/006857 | 1/2005 |
| WO | WO 2007/147550 | 12/2007 |
| WO | WO 2008/035304 | 3/2008 |
| WO | WO 2010/017306 | 2/2010 |
| WO | WO 2010/033908 | 3/2010 |
| WO | WO 2010/151730 | 12/2010 |

OTHER PUBLICATIONS

"Rodent Bait Stations," accessed from http://store.doyourownpestcontrol.com/Catalog/Rat-Rodent-Control-Products on Jan. 13, 2011.

Morris et al., "Comparative Evaluation of Tamper-Proof Mouse Bait Station," Proceedings of the Thirteenth Vertebrate Pest Conference, 1988.

Notice of Allowance Issued in U.S. Appl. No. 12/186,436, dated Sep. 15, 2010.

Notice of Allowance, issued in U.S. Appl. No. 10/550,378, dated Mar. 16, 2010.

Notice of Manufacturers, Formulators Registrants and Users of Pesticides, United States Environmental Protection Agency, Washington, D.C., Sep. 16, 1994.

Office Action issued in U.S. Appl. No. 13/013,665, dated Aug. 29, 2011.

Office Action, issued in U.S. Appl. No. 10/550,378 dated Aug. 21, 2007.

Office Action, issued in U.S. Appl. No. 10/550,378, dated Dec. 28, 2007.

Office Action, issued in U.S. Appl. No. 10/550,378, dated Sep. 19, 2008.

Office Action, issued in U.S. Appl. No. 10/550,378, dated Feb. 18, 2009.

Office Action, issued in U.S. Appl. No. 10/550,378, dated Jul. 8, 2009.

Office Action, issued in U.S. Appl. No. 10/550,378, dated Nov. 12, 2009.

Office Action, issued in U.S. Appl. No. 11/786,355, dated Jul. 14, 2009.

Office Action, issued in U.S. Appl. No. 11/786,355, dated Jan. 19, 2010.

Office Action, issued in U.S. Appl. No. 11/786,355, dated Aug. 18, 2010.

Office Action, issued in U.S. Appl. No. 11/786,355, dated Apr. 15, 2011.

Office Action, issued in U.S. Appl. No. 12/816,300, dated Aug. 25, 2011.

Office Action, issued in U.S. Appl. No. 12/816,306, dated Jun. 28, 2011.

Office Action, issued in U.S. Appl. No. 12/816,306, dated Sep. 30, 2010.

Office Action, issued in U.S. Appl. No. 12/816,315, dated Sep. 30, 2010.

(56) References Cited

OTHER PUBLICATIONS

Office Action, issued in U.S. Appl. No. 12/816,315, dated Jun. 15, 2011.
PCT International Search Report and Written Opinion, issued in International Application No. PCT/2009/052868, dated Apr. 28, 2010.
PCT International Search Report, issued in International application No. PCT/US2009/056246, dated Jun. 25, 2010.
PCT Invitation to Pay Additional Fees, in Int. App. No. PCT/US2009/052868, mailed Mar. 4, 2010.
Response to Office Action, issued in U.S. Appl. No. 12/816,306, dated Mar. 30, 2011.
Response to Office Action, issued in U.S. Appl. No. 12/816,315, dated Mar. 30, 2011.
Response to Office Action, submitted in U.S. Appl. No. 10/550,378, dated Dec. 9, 2008.
Response to Office Action, submitted in U.S. Appl. No. 10/550,378, dated May 13, 2009.
Response to Office Action, submitted in U.S. Appl. No. 10/550,378, dated Aug. 26, 2009.
Response to Office Action, submitted in U.S. Appl. No. 10/550,378, dated Feb. 12, 2010.
Response to Office Action, submitted in U.S. Appl. No. 10/550,378, dated Oct. 22, 2007.
Response to Office Action, submitted in U.S. Appl. No. 10/550,378, dated Jun. 27, 2008.
Response to Office Action, submitted in U.S. Appl. No. 11/786,355, dated Nov. 16, 2009.
Response to Office Action, submitted in U.S. Appl. No. 11/786,355, dated May 24, 2010.
Response to Office Action, submitted in U.S. Appl. No. 13/013,665, dated Feb. 29, 2012.
Spurr et al., "Bait station preferences of Norway rats," Doc Research & Development Series 255, 2006.
Supplemental Response to Office Action, submitted in U.S. Appl. No. 10/550,378, dated May 13, 2009.

\* cited by examiner

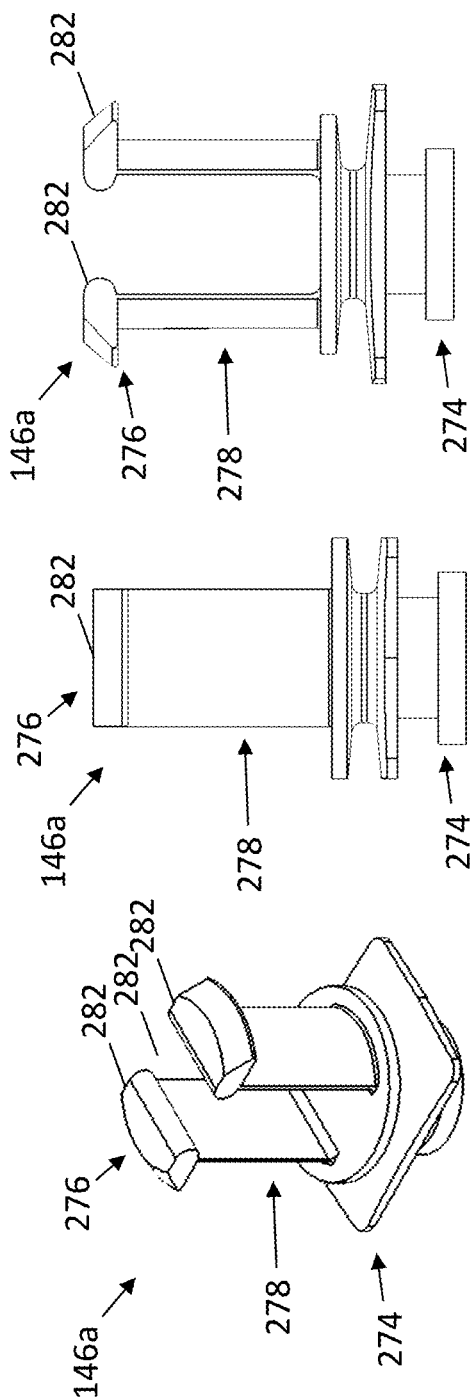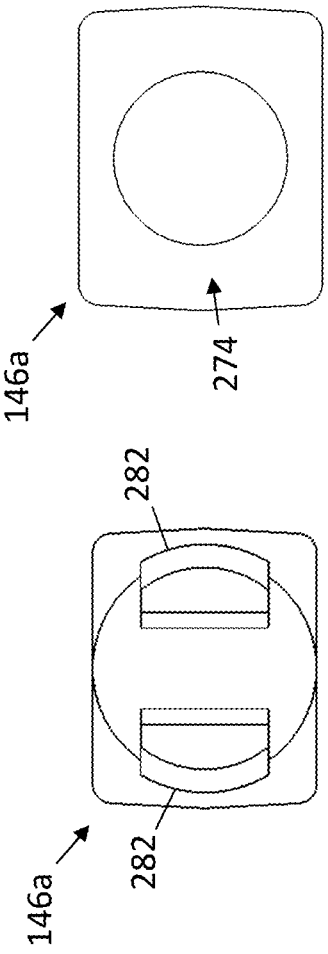

RODENT TRAP WITH PRESENCE INDICATOR MECHANISM

CROSS-REFERENCE TO RELATED APPLICATIONS

This application claims priority to U.S. Provisional Application No. 62/504,279, filed May 10, 2017, the entire contents of which application is specifically incorporated by reference herein without disclaimer.

BACKGROUND

1. Field of Invention

The present invention relates generally to pest (e.g., rodent) management and, more particularly, but not by way of limitation, to pest-management apparatuses and methods.

2. Description of Related Art

Examples of pest-management apparatuses are disclosed in U.S. Pat. Nos.: (1) 4,026,068; (2) 4,028,829; (3) 4,660,320; (4) 5,953,854; (5) 6,082,042; and (6) 6,343,434, and (7) Pub. No. US 2014/0071276.

SUMMARY

This disclosure includes embodiments of pest-management apparatuses (e.g., stations or bait stations) and methods of use.

Some embodiments of the present pest-management apparatuses comprise a base having a sidewall that defines an external perimeter of the base; a lid coupled to the base such that the lid is movable relative to the base between an open position and a closed position in which the lid and the base cooperate to define a chamber, the lid having an exterior surface defining a first portion and a second portion that is disposed above the first portion when the lid is in the closed position; a pest-capture device disposable within the chamber, the pest-capture device having a body and a capture element that is movable relative to the body between a set position and a capture position; an elongated, resilient indicator having a first end and a second end; where the first end of the indicator is configured to be coupled to the capture element of the pest-capture device such that: the indicator extends through and is movable relative to the lid; if the lid is in the closed position and the capture element is in the set position, the first portion of the indicator is visible from outside of the chamber and extends through an opening extending through the first portion of the exterior surface; and if the lid is in the closed position and the capture element is in the capture position, at least a majority of the first portion of the indicator is not visible from outside of the chamber.

Some embodiments of the present pest-management apparatuses comprise a base having a sidewall that defines an external perimeter of the base; a lid coupled to the base such that the lid is movable relative to the base between an open position and a closed position in which the lid and the base cooperate to define a chamber; a pest-capture device disposable within the chamber, the pest-capture device having a body and a capture element that is movable relative to the body between a set position and a capture position; an elongated, resilient indicator having a first end, a second end, and a first portion disposed between the first end and the second end; where the first end of the indicator is configured to be coupled to the capture element of the pest-capture device such that: the indicator extends through and is movable relative to the lid; if the lid is in the closed position and the capture element is in the set position, the first portion of the indicator is visible from outside of the chamber and the second end of the indicator extends above the lid and laterally beyond an external perimeter of the base; and if the lid is in the closed position and the capture element is in the capture position, at least a majority of the first portion of the indicator is not visible from outside of the chamber.

In some embodiments of the present apparatuses, if the lid is in the closed position and the capture element is in the capture position, the second end is disposed within the chamber.

In some embodiments of the present apparatuses, the indicator includes a second portion adjacent to the first portion and disposed between the first portion and the second end; and an upper surface of the indicator on the first portion includes a first color and the upper surface of the indicator on the second portion includes a second color that is visually distinct from the first color.

Some embodiments of the present pest-management apparatuses comprise a base having a sidewall that defines an external perimeter of the base; a lid coupled to the base such that the lid is movable relative to the base between an open position and a closed position in which the lid and the base cooperate to define a chamber; a pest-capture device disposable within the chamber, the pest-capture device having a body and a capture element that is movable relative to the body between a set position and a capture position; and an elongated, resilient indicator having a first end, a second end, a first portion disposed between the first end and the second end, and a second portion adjacent to the first portion and disposed between the first portion and the second end, where an upper surface of the indicator on the first portion includes a first color and the upper surface of the indicator on the second portion includes a second color that is visually distinct from the first color; where the first end of the indicator is configured to be coupled to the capture element of the pest-capture device such that: the indicator extends through and is movable relative to the lid; if the lid is in the closed position and the capture element is in the set position, the first portion of the indicator is visible from outside of the chamber; and if the lid is in the closed position and the capture element is in the capture position, at least a majority of the first portion of the indicator is not visible from outside of the chamber.

In some embodiments of the present apparatuses, when the lid is in the closed position and the capture element is in the set position, the second end of the indicator extends laterally beyond the external perimeter of the base.

In some embodiments of the present apparatuses, when the lid is in the closed position and the capture element is in the set position, the second end of the indicator extends above the lid.

In some embodiments of the present apparatuses, the upper surface of the indicator on the first portion does not include the second color. In some embodiments of the present apparatuses, the upper surface of the indicator on the first portion consists of the first color. In some embodiments of the present apparatuses, the upper surface of the indicator on the second portion does not include the first color. In some embodiments of the present apparatuses, the upper surface of the indicator on the second portion consists of the second color.

In some embodiments of the present apparatuses, when the lid is in the closed position and the capture element is in the capture position, the first color is not visible from outside of the chamber. In some embodiments of the present apparatuses, when the lid is in the closed position and the capture element is in the capture position, at least a majority of the second portion is visible from outside of the chamber. In some embodiments of the present apparatuses, when the lid is in the closed position and the capture element is in the set position, the second end of the indicator extends laterally beyond the external perimeter of the base. In some embodiments of the present apparatuses, when the lid is in the closed position and the capture element is in the capture position, the second end of the indicator extends above the lid.

In some embodiments of the present apparatuses, the apparatus is configured such that movement of the indicator from a first position to a second position moves the capture element from the capture position to the set position.

In some embodiments of the present apparatuses, the indicator has a long dimension and a thickness and a width, the thickness and the width each taken perpendicularly to the long dimension; and the width is at least two times the thickness. In some embodiments of the present apparatuses, the indicator comprises a cable tie or zip tie. In some embodiments of the present apparatuses, at least a portion of the indicator includes a reflective surface.

Some embodiments of the present apparatuses include a protrusion extending from an outer surface of one of the base and the lid; and the protrusion is configured to contact the indicator when the lid is in the closed position and the capture element is in at least one of the capture position and the set position. In some embodiments of the present apparatuses, the protrusion includes an inclined or curved surface, at least a portion of which is angularly disposed relative to the outer surface of the one of the base and the lid; and the inclined or curved surface is configured to contact the indicator when the lid is in the closed position and the capture element is in at least one of the capture position and the set position.

Some embodiments of the present apparatuses include a separator; a divider; and at least one barrier member.

In some embodiments of the present apparatuses, the lid comprises an opening configured to allow passage of light into at least a portion of the chamber.

Some embodiments of the present apparatuses comprise a snap trap. In some embodiments of the present apparatuses, the capture element comprises a jaw. In some embodiments of the present apparatuses, the capture element comprises a hammer. In some embodiments of the present apparatuses, the capture element is biased toward the capture position.

In some embodiments of the present apparatuses, the lid is configured to be coupled to the base such that, when the lid is in the open position, the lid is decoupled from the base.

In some embodiments of the present apparatuses, the at least a majority of the first portion of the indicator is visible from outside of the chamber if the capture element is in the set position.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment(s) depicted in the figures.

FIGS. 18A-18E depict perspective, first side, second side, top, and bottom views, respectively, of a fastener suitable for use in some embodiments of the present pest-management apparatuses.

DETAILED DESCRIPTION OF ILLUSTRATIVE EMBODIMENTS

Figure 1:
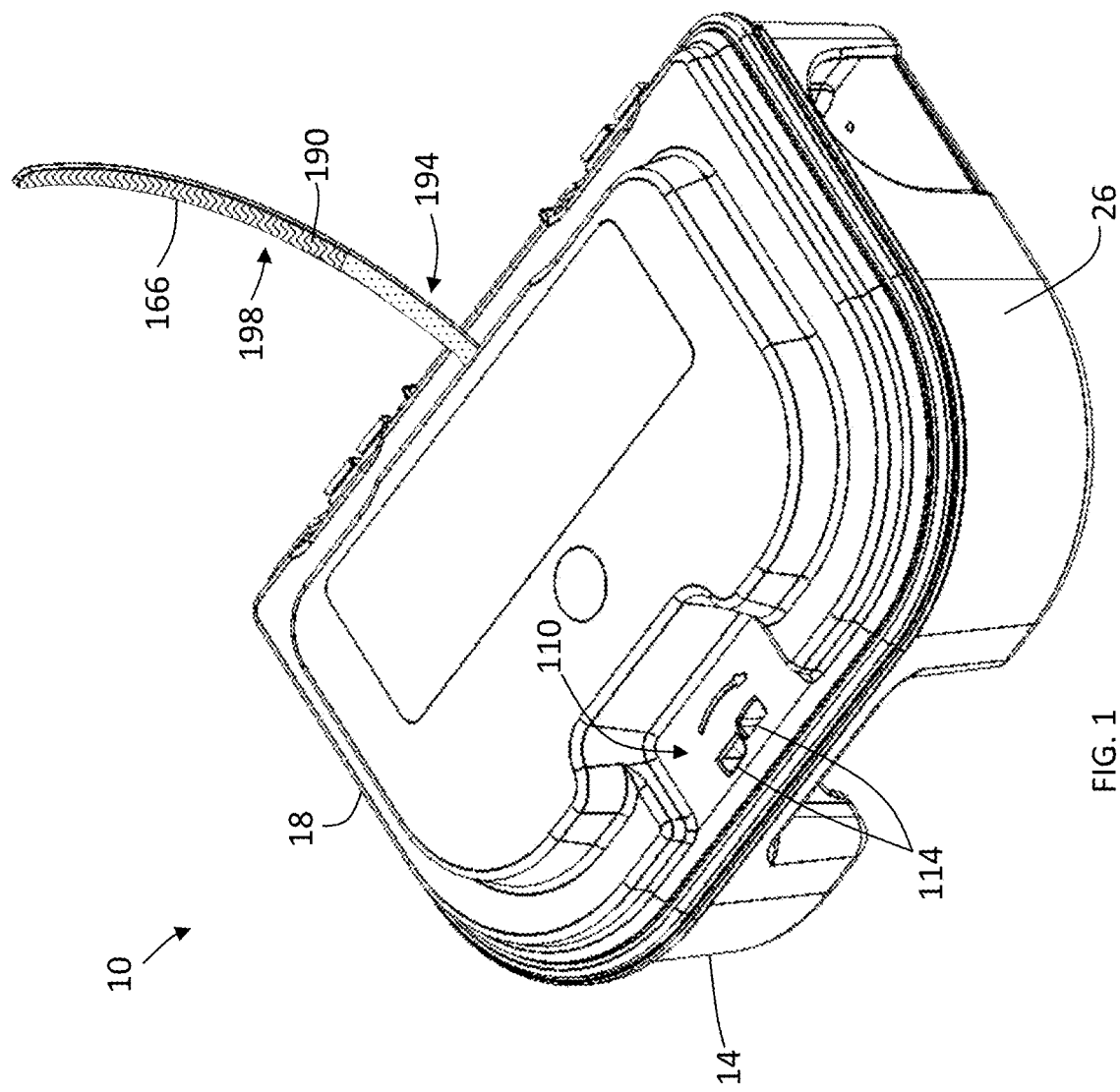
FIG. 1 is a perspective view of one embodiment of the present pest-management apparatuses, shown in a closed position.
Figure 2:
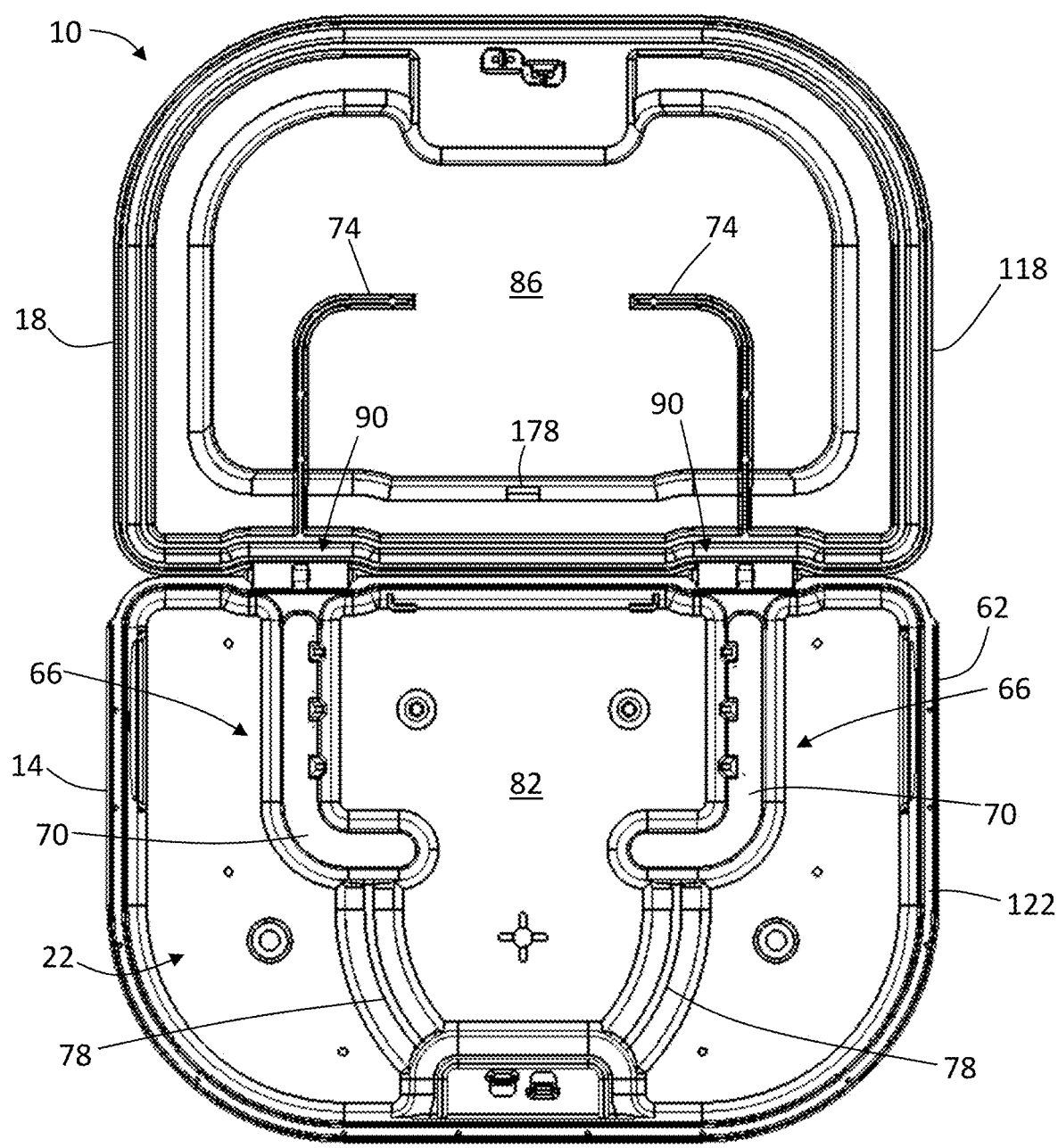
FIGS. 2 and 3 are top and perspective views, respectively, of the pest-management apparatus of FIG. 1, shown in an open position with some components omitted.

Referring now to the drawings, shown therein and designated by the reference numeral 10 is one embodiment of the present pest-management apparatuses. As will be described in more detail below, in the embodiment shown, apparatus 10 includes a base 14 and a lid 18 configured to be coupled to the base such that the lid is movable (e.g., including removable) relative to the base between an open position (FIG. 3) and a closed position (FIG. 1) in which the base and the lid cooperate to define an interior chamber 22. Each of base 14 and lid 18 may be separately molded from a suitable (e.g., plastic) material. In other embodiments, a base (e.g., 14) and a lid (e.g., 18) may be integrally formed from a suitable (e.g., plastic) material.

Figure 6:
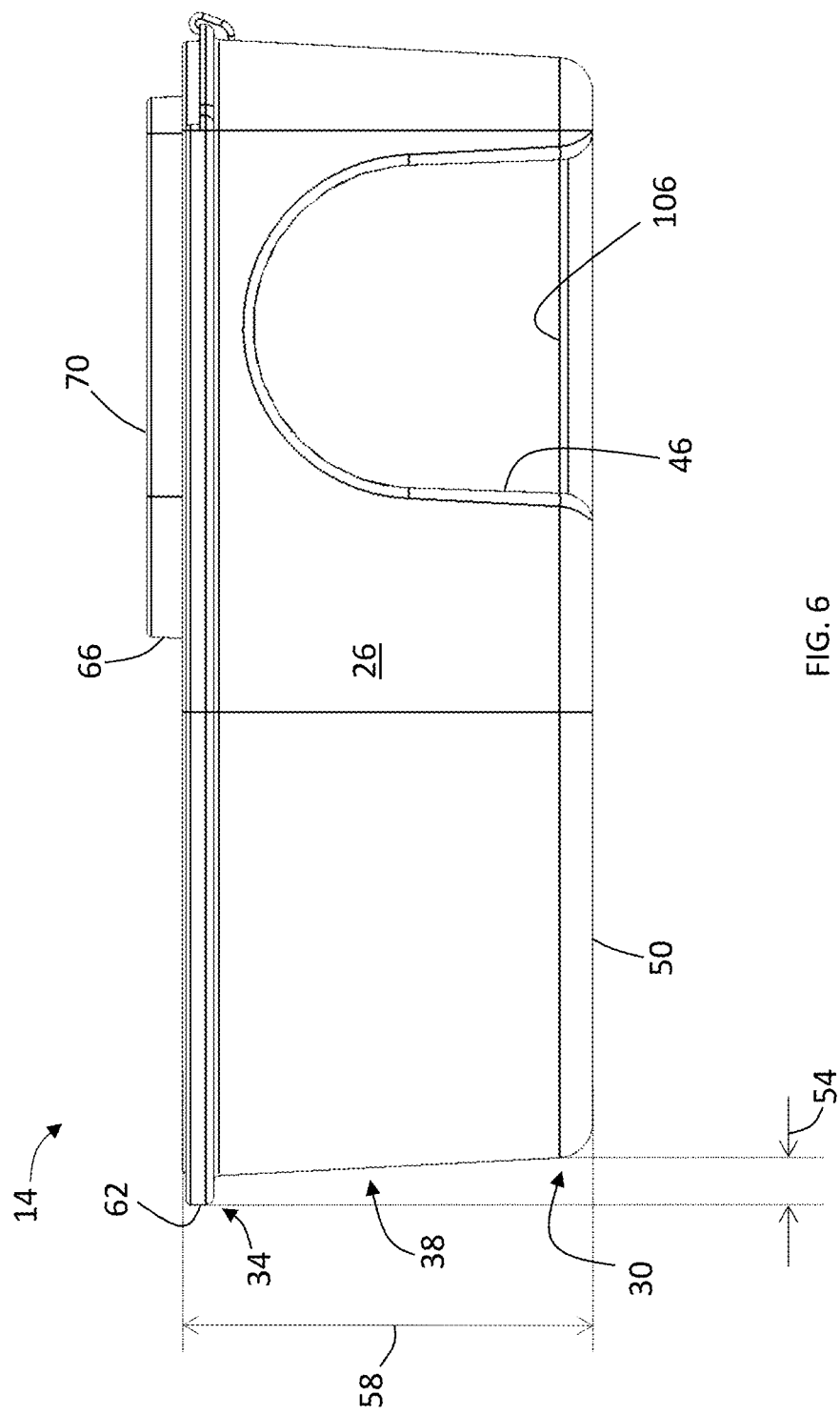

In the depicted embodiment, base 14 includes a sidewall 26 that defines an external perimeter of apparatus 10. More particularly, in the embodiment shown (e.g., FIG. 6), sidewall 26 includes a lower portion 30, an upper portion 34, and a middle portion 38 disposed between the upper and lower portions. In this embodiment, sidewall 26 of base 14 includes corner portions 42 (FIG. 3) across which the sidewall may change direction. Corner portions 42 may include any appropriate shape (e.g., to guide a rodent exterior to base 14 toward opening(s) 46). For example, one or more corner portions 42 may be curved or flat. In some embodiments, at least one corner portion 42 (e.g., two corner portions closest to lid 18, in the embodiment shown, for example, in FIG. 3) includes a first radius of curvature and at least one other corner portion (e.g., two corner portions opposite the lid, in the embodiment shown, for example, in FIG. 3) includes a second radius of curvature greater than the first radius of curvature. For example, the second radius of curvature may be more than any of, or between any of two of: 50, 60, 75, 90, or 100 percent of the first radius of curvature. In the embodiment shown, middle portion 38 of sidewall 26 between corner portions 42 is substantially planar. Nevertheless, sidewalls (e.g., 26) of the present bases (e.g., 14) may comprise any suitable shape, such as, for example, including corner portion(s) (e.g., 42) that are sharp (e.g., so as to define an edge), and/or the like, including a middle portion (e.g., 38) that is curved (e.g., concave or convex), and/or the like. In this embodiment, base 14 includes a floor 50 from which sidewall 26 extends; however, in other embodiments, a floor (e.g., 50), or a portion thereof, of a base (e.g., 14) may be omitted, and, in such embodiments, a surface upon which the base is disposed may function, at least in part, as the floor.

In the depicted embodiment, sidewall 26 may be configured to discourage a rodent at or near the sidewall from climbing on top of lid 18 when the lid is in the closed position. For example, in the embodiment shown, middle portion 38, or a portion thereof, of sidewall 26 is disposed at a non-perpendicular angle relative to floor 50, such that, for example, a corresponding upper portion 34 of the sidewall extends laterally beyond a corresponding lower portion 30 of the sidewall (FIG. 6) (e.g., base 14 may taper in a transverse dimension across the middle portion from the corresponding upper portion to the corresponding lower portion). More particularly, in this embodiment, upper portion 34, or a portion thereof, extends laterally beyond a corresponding lower portion 30 by a distance 54 that is at least 5 percent (e.g., 10, 15, 20, 25, 30, or more percent) of a height 58 of the sidewall. For further example, in the depicted embodiment, upper portion 34 of sidewall 26 includes a lip 62 that extends laterally in a direction away from chamber 22.

Figure 3:
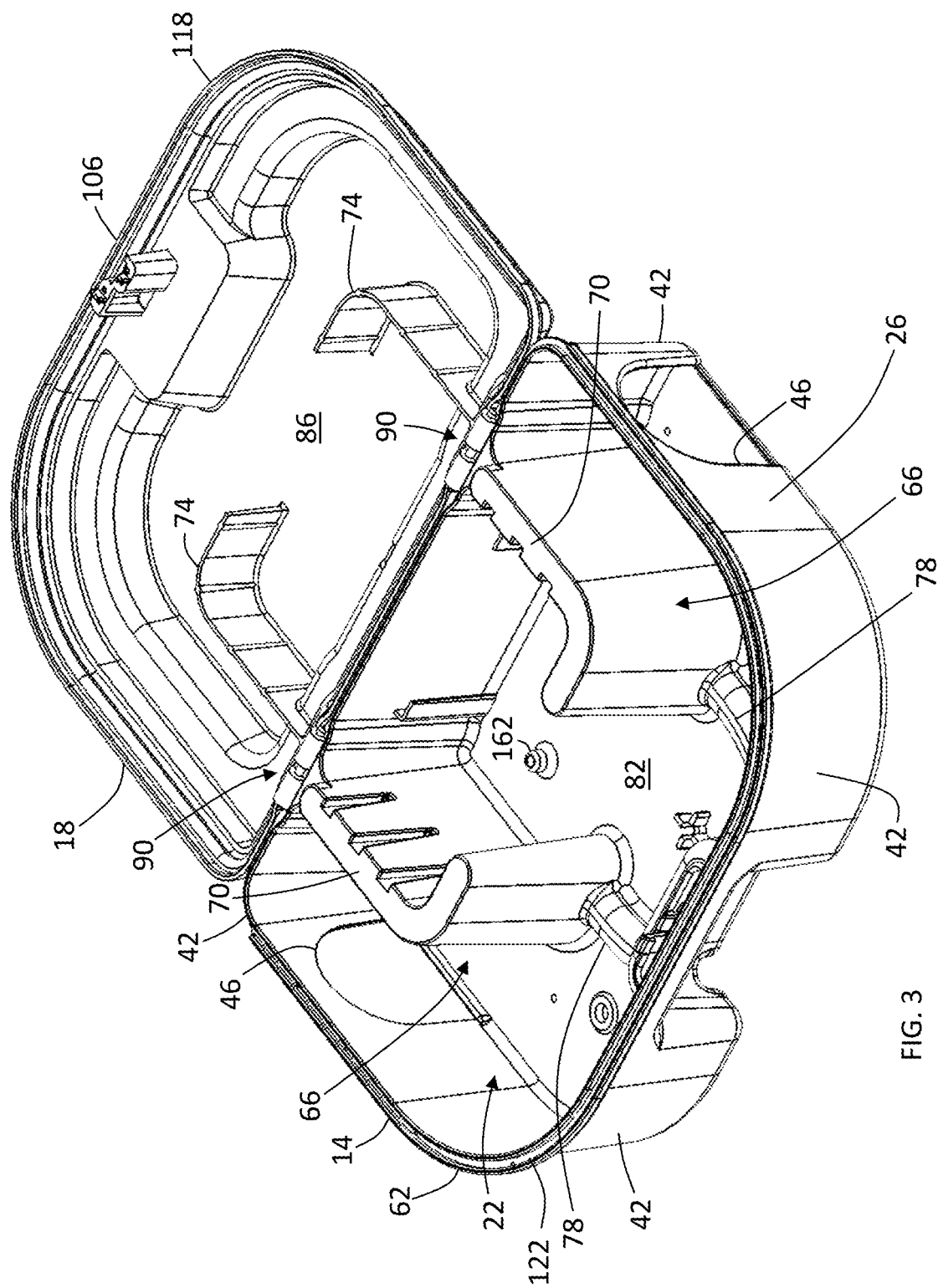

In the embodiment shown, base 14 includes one or more interior walls 66 (e.g., two interior walls 66, as shown in the embodiment, for example, in FIG. 3), each extending substantially vertically from floor 50 and toward a top of the base. In the depicted embodiment, at least one of interior wall(s) 66 is configured to prevent a rodent from climbing over the interior wall when lid 18 is in the closed position. For example, in the embodiment shown, at least one of interior wall(s) 66 includes an upper surface 70 configured to contact lid 18 (e.g., one or more ridges 74 thereof) when the lid is in the closed position. In this embodiment, at least one of interior wall(s) 66 at least partially extends above upper portion 34 (e.g., lip 62) of sidewall 26 such that upper surface 70 is disposed at least partially above the sidewall, as shown, for example, in FIG. 6.

In the depicted embodiment, base 14 includes one or more interior protrusions 78, such as ridges (e.g., two protrusions 78, as shown) that each extend from floor 50 and toward a top of the base. When lid 18 is in the closed position, interior wall(s) 66 and protrusion(s) 78 may cooperate with the lid to define a bait subchamber 82 within chamber 22. In the embodiment shown, protrusion(s) 78 are located such that, when lid 18 is in the closed position, at least a portion of chamber 22 may only be accessed by passing over at least one of the protrusion(s). For example, in this embodiment, one or more protrusions 78 each extend between sidewall 26 and an interior wall 66 such that, for example, when lid 18 is in the closed position, access to bait subchamber 82 is only possible by passing over one of the protrusion(s). In the depicted embodiment, one or more protrusions 78 each include a height (e.g., extending in a direction perpendicular to floor 50), which is selected to allow a rodent to climb over the protrusion when lid 18 is in the closed position, but to inhibit liquids from reaching at least a portion of chamber 22, such as, for example, bait subchamber 82. The height of one or more protrusions 78 may be less than (e.g., such as 40, 50, 75, 80, or 90 percent of) a height of interior walls 66.

In the embodiment shown, lid 18 includes one or more ridges 74 (e.g., two ridges 74, as shown), each extending from an inner surface 86 of lid 18. In this embodiment, when lid 18 is in the closed position, each ridge 74 is configured to contact a respective interior wall 66 (e.g., surface 70) of base 14, such that, for example, the ridge(s) and interior wall(s) cooperate to define bait subchamber 82. In at least this way, when lid 18 is in the closed position, inner surface 86, or a portion thereof, of the lid may be spaced apart from base 14 by one or more ridges 74, thereby providing for an increased volume within chamber 22. In some embodiments (e.g., 10), such ridge(s) (e.g., 74) may be configured to increase a stiffness of a lid (e.g., 18).

Figure 4:
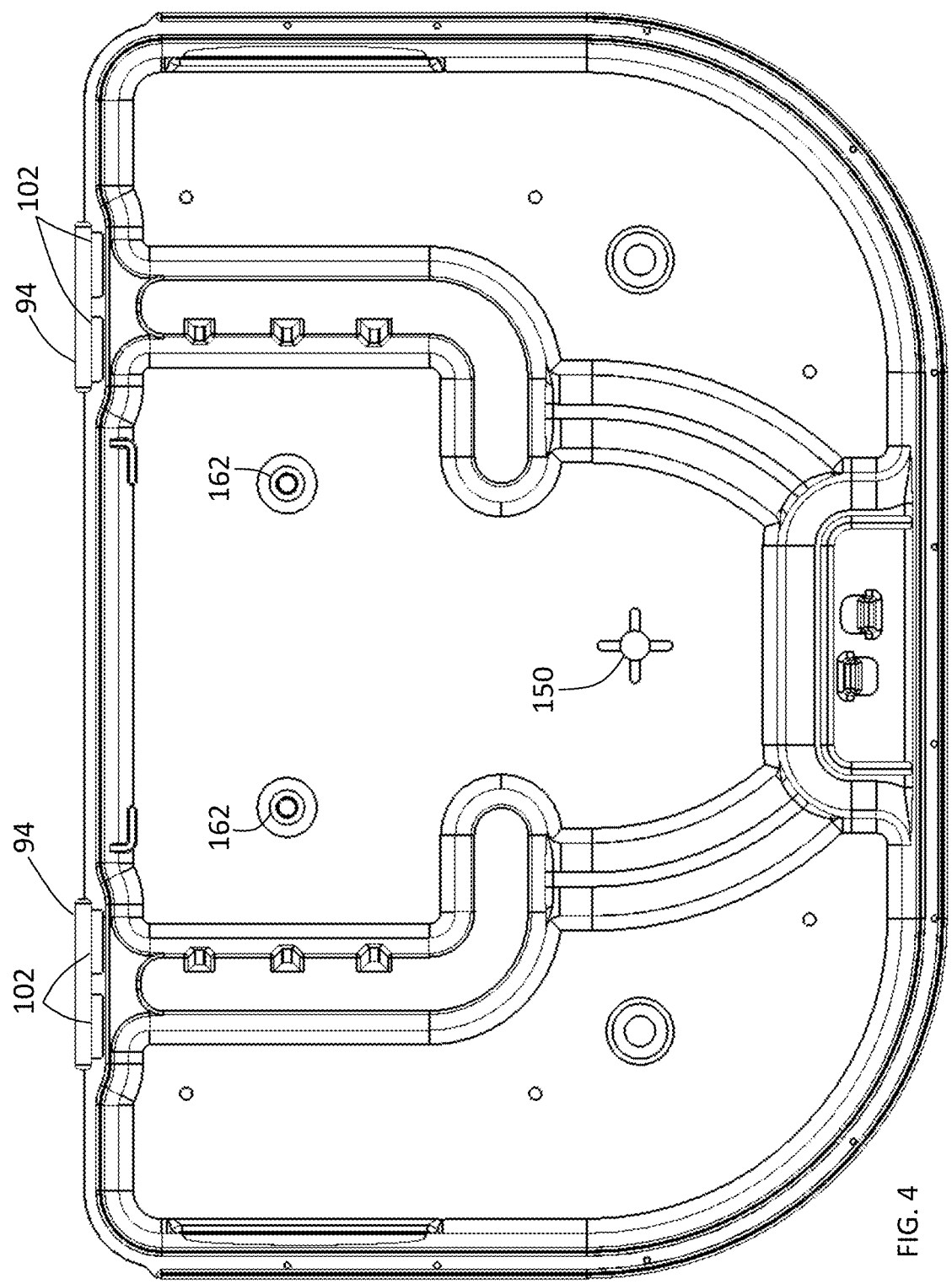
FIGS. 4-6 are top, perspective, and side views, respectively, of a base suitable for use in some embodiments of the present pest-management apparatuses.
Figure 5:
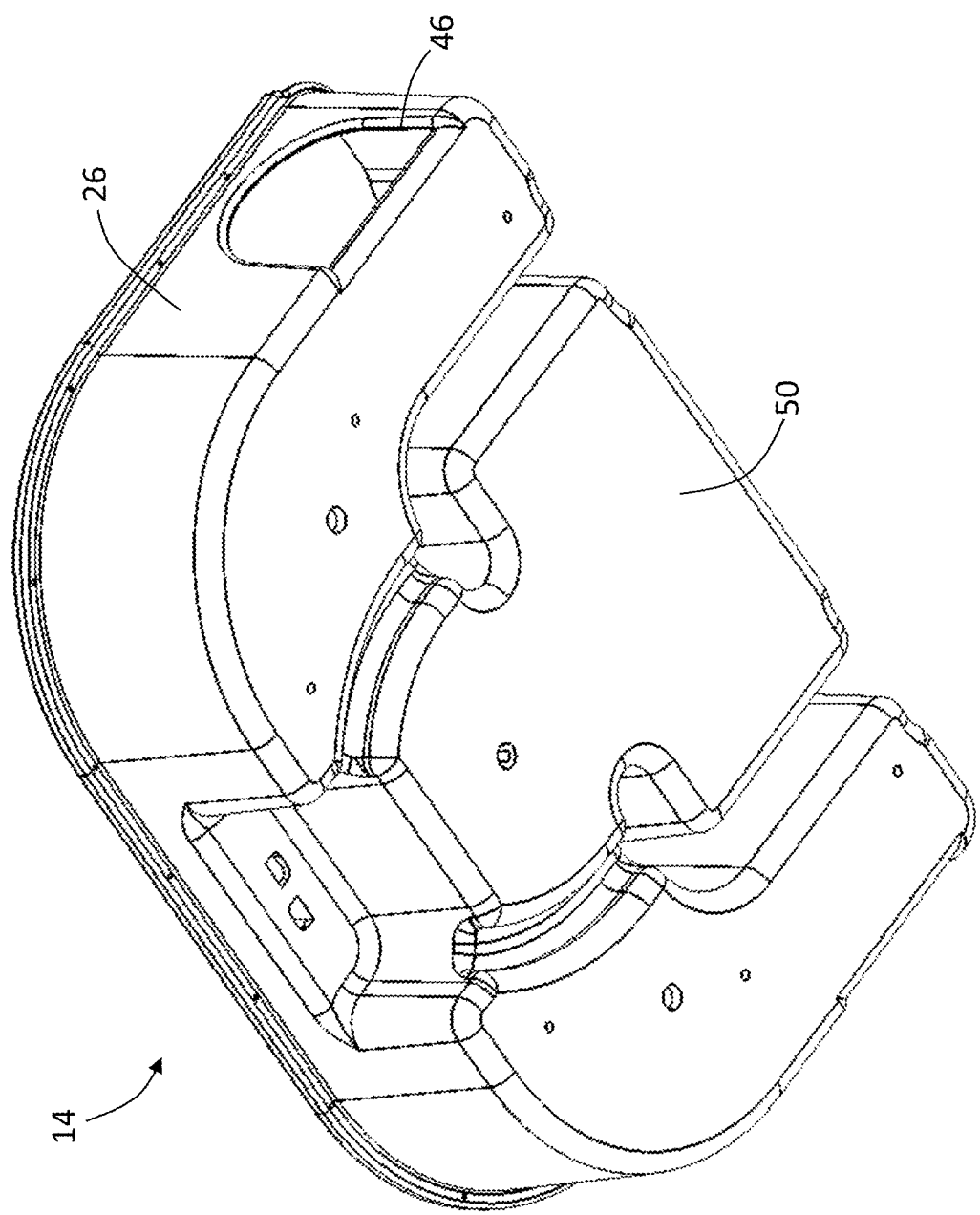
Figure 7:
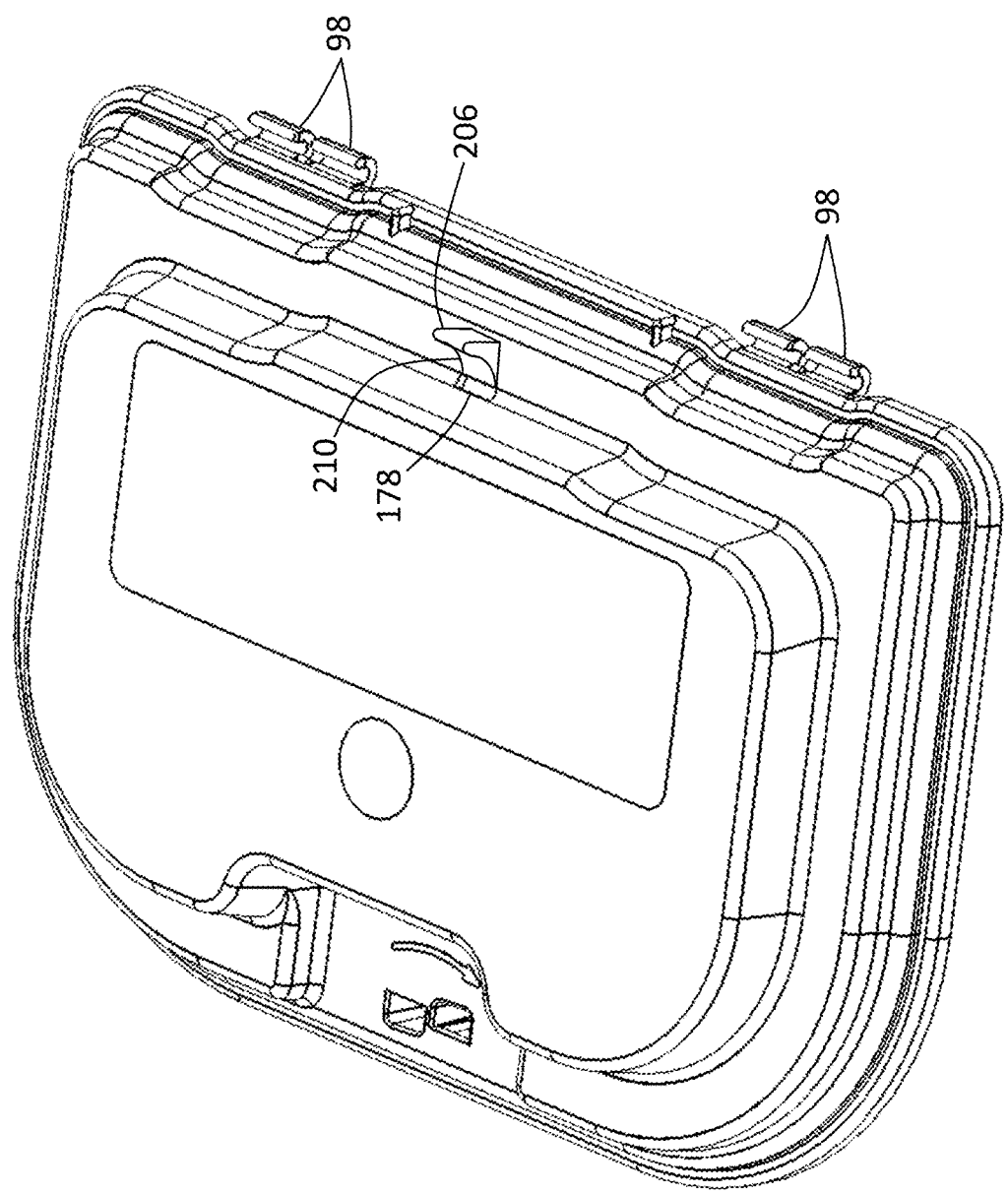
FIG. 7 is a perspective view of a lid suitable for use in some embodiments of the present pest-management apparatuses.

In the depicted embodiment, lid 18 is configured to be coupled to base 14 via one or more hinges 90 (e.g., two hinges 90, as shown). For example, in the embodiment shown, each hinge 90 includes a hinge pin 94 (FIG. 4) and one or more hooks 98 (FIG. 7), where the hinge pin is configured to be pivotally received within an interior channel of each of the hook(s). In this embodiment, for each hinge 90, the interior channel of each of hook(s) 98 is open in cross-section, such that, for example, the hinge may be assembled or disassembled by pressing hinge pin 94 (e.g., laterally) into or out of, respectively, the interior channel. In the depicted embodiment, for at least one of hinge(s) 90, hook(s) 98 are a component of (e.g., are coupled to or integrally formed with) lid 18 and hinge pin 94 is a component of (e.g., is coupled to or integrally formed with) base 14. Accordingly, in the embodiment shown, base 14 may include one or more openings 102, each configured to receive a respective one of hook(s) 98 as lid 18 is pivoted relative to the base (e.g., to prevent interference between the hook(s) and the base). In other embodiments, hook(s) (e.g., 98) of a hinge (e.g., 90) may be a component of a base (e.g., 14) and a hinge pin (e.g., 94) of the hinge may be a component of a lid (e.g., 18). In yet other embodiments, a lid (e.g., 18) may be integrally formed with a base (e.g., 14), such that, for example, hinge(s) (e.g., 90) comprise living hinges. In yet other embodiments, a lid (e.g., 18) may be coupled to a base (e.g., 14) in any suitable fashion, such as, for example, being slidably coupled to the base, removably (e.g., detachably) coupled to the base (e.g., without hinges 90), and/or the like.

In this embodiment, apparatus 10 includes at least one opening 46 (e.g., two openings 46, as shown), each configured to permit a rodent exterior to the apparatus to enter chamber 22. In the depicted embodiment, a lower-most portion 106 of at least one of openings(s) 46 is spaced above a bottom of base 14 (e.g., by 0.2, 0.4, 0.6, 0.8, 1.0, 1.2, 1.4, 1.6, 1.8, 2.0, or more centimeters (cm)), which may inhibit liquids from entering chamber 22 through the opening. In the embodiment shown, each opening 46 is defined by base 14 alone (e.g., the entire outer perimeter of the opening is defined by the base); however, in other embodiments, one or more openings (e.g., 46) may be defined by a base (e.g., 14) and a lid (e.g., 18), when the lid is in a closed position, and/or by the lid alone.

Some embodiments of the present apparatuses (e.g., 10) may be configured to inhibit unauthorized access to a chamber (e.g., 22), or a portion thereof. For example, in this embodiment, apparatus 10 includes a lock 110 configured to releasably secure lid 18 in the closed position. More particularly, in the depicted embodiment, lock 110 includes one or more latching protrusions, each coupled to, or integrally formed with, one of lid 18 and base 14 and configured to be received by a corresponding latching protrusion or opening of the other of the lid and the base when the lid is in the closed position. In the embodiment shown, lock 110 includes one or more openings 114 defined by one of lid 18 or base 14 and located such that a key or other implement may be inserted into the one or more openings to disengage each of the one or more latching protrusions from its corresponding latching protrusion or opening, thereby permitting movement of the lid from the closed position.

For further example, in the depicted embodiment, lid 18 includes a lip 118 extending from (e.g., substantially all of or all of) a periphery thereof and configured to be received by base 14 when the lid is in the closed position. More particularly, in the embodiment shown, lip 118 is configured to be received by a groove 122 of base 14, which may be defined by lip 62. In this embodiment, lip 118 may be configured to be closely or tightly received by groove 122, such that, for example, an outer-most face of the lip is immediately adjacent or is in contact with an inner face of the groove (e.g., which may frustrate or prevent insertion of an implement between the lip and the groove in an attempt to pry lid 18 from the closed position).

For yet further example, in the depicted embodiment, apparatus 10 is configured such that, when lid 18 is in the closed position, access to bait subchamber 82 through opening(s) 46 using a human hand or implement is inhibited. To illustrate, in the embodiment shown, bait subchamber 82 is not visible through opening(s) 46, and direct access to the bait subchamber through each opening is obstructed by a respective interior wall 66.

Figure 8:
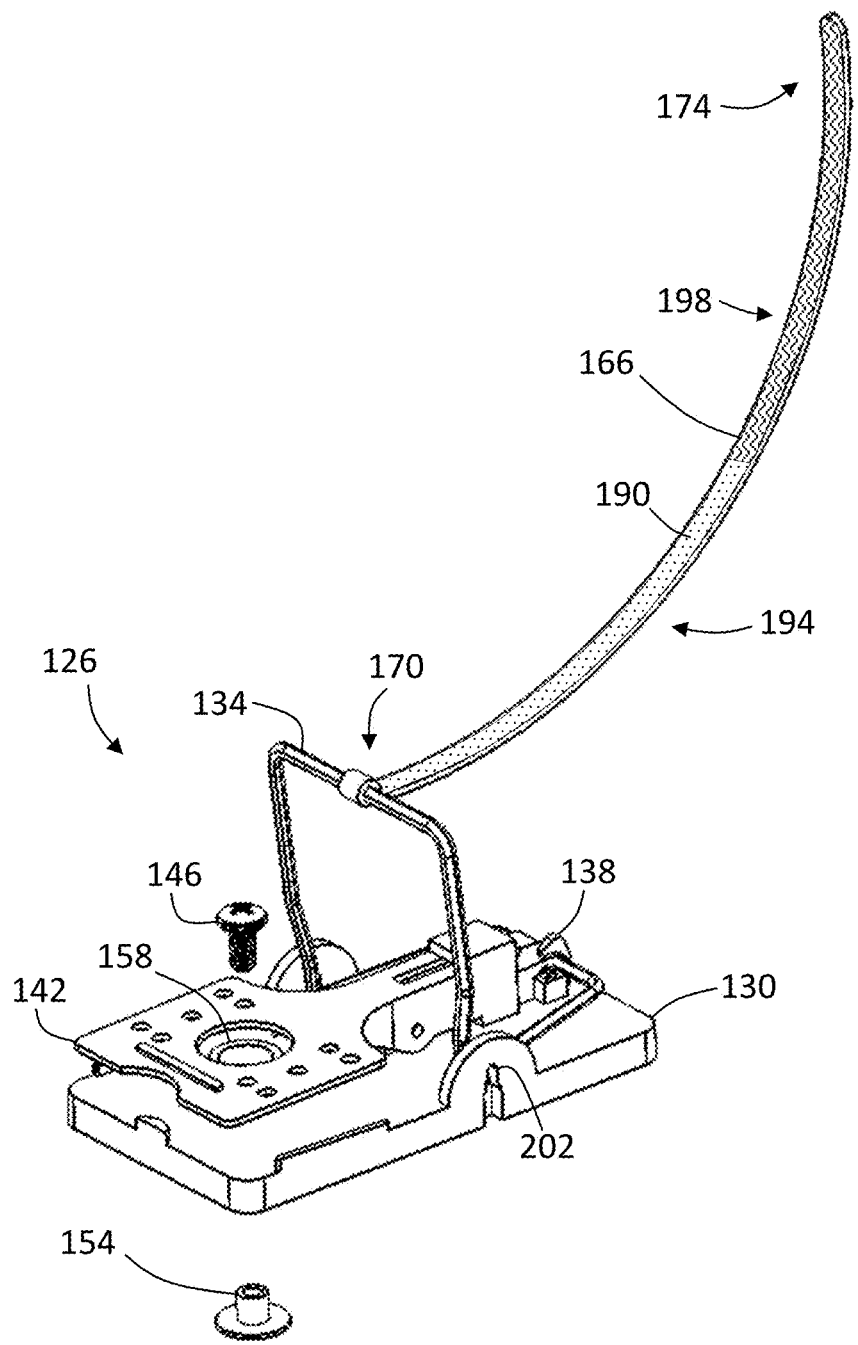
FIG. 8 is a perspective view of a pest-capture device and an indicator, each of which may be suitable for use in some embodiments of the present pest-management apparatuses.

In this embodiment, apparatus 10 includes a pest-capture device 126 (FIG. 8), which is disposable within chamber 22 (e.g., bait subchamber 82) and is configured to prevent a pest that is captured by the pest-capture device from exiting the chamber. In the depicted embodiment, pest-capture device 126 comprises a snap trap, having a body 130 and a capture element 134 (e.g., a hammer), which is movable relative to the body between a set position (e.g., as shown, for example, in FIG. 8) and a capture position in which the capture element is closer to the body. In other embodiments, a capture element (e.g., 134) may include a jaw. In the embodiment shown, capture element 134 may be biased toward the capture position via a biasing member, such as, for example, a spring. In this embodiment, pest-capture device 126 includes a releasable catch 138 configured to retain capture element 134 in the set position and a trigger 142 coupled to the catch such that movement of the trigger may cause the catch to release, thereby allowing movement of the capture element toward the capture position. In other embodiments, a pest-capture device (e.g., 126) may include an electric trap, an adhesive mat, and/or the like.

In the depicted embodiment, pest-capture device 126 is configured to be coupled to base 14 via one or more fasteners 146, such as a screw, that may be disposed into or through body 130 of pest-capture device 126 and into or through base 14. More particularly, in the embodiment shown, base 14 defines an opening 150 (e.g., through floor 50) configured to receive a threaded sleeve 154, and body 130 of pest-capture device defines an opening 158 through which fastener 146 may be disposed to be threadably received by the threaded sleeve. In this embodiment, base 14 includes at least one protrusion 162 (e.g., two protrusions 162 shown) that extends upwardly from floor 50 and toward a top of the base, where the at least one protrusion is configured to (e.g., physically) restrict lateral movement of pest-capture device 126 relative to the base when the pest-capture device is coupled to the base. However, in other embodiments, a pest-capture device (e.g., 126) may be coupled to other components of an apparatus (e.g., base 14, lid 18, and/or the like), and such coupling may be accomplished in any suitable fashion, such as, for example, via fastener(s), adhesive, interlocking features, and/or the like).

In the depicted embodiment, apparatus 10 includes an indicator 166 configured to visually indicate to a user the state of pest-capture device 126 (e.g., set, actuated, and/or the like) disposed within chamber 22 when lid 18 is in the closed position. For example, in the embodiment shown, indicator 166 is configured to be coupled to pest-capture device 126 such that the indicator is movable in response to actuation of the pest-capture device, where movement of the indicator may be detected (e.g., by a user) from outside of chamber 22 without opening the device.

In this embodiment, indicator 166 comprises an elongated member having a first end 170 and a second end 174. Indicator 166 may be configured to, when in at least one position, extend outside of chamber 22, such as, for example, through an opening 178 defined by at least one of base 14 and lid 18 (e.g., by the lid alone, in the depicted embodiment). In the embodiment shown, indicator 166 may be flexible and resilient (e.g., spring-like) and may comprise a suitable (e.g., metal or plastic) material. In this embodiment, indicator 166 has a long dimension and a width and a thickness, each taken perpendicularly to the long dimension, where the width is larger than the thickness (e.g., at least 1.25, 1.50, 1.75, 2.00, 2.25, 2.50, 2.75, 3.00, 3.25, 3.50, 3.75, 4.00, 4.25, 4.50, 4.75, or 5.00 times the thickness), such that, for example, the indicator is less resistant to bending about one axis (e.g., an axis perpendicular to floor 50) than another axis (e.g., an axis parallel to a rotational axis of lid 18). In these ways and others, indicator 166 may be configured, through flexibility, to mitigate undesirable interference between the indicator and other components of apparatus 10, such as base 14 and/or lid 18 (e.g., during opening or closing of lid 18 and during actuation of pest-capture device 126), while, through resilience, being able to extend upwardly from chamber 22 (e.g., in a direction generally indicated by arrow 182) and/or laterally outward from the chamber (e.g., in a direction generally indicated by arrow 186), thereby enhancing visibility of the indicator. In the embodiment shown, indicator 166 includes a user-facing upper surface 190 (e.g., extending along the long dimension thereof), at least a portion of which is visible (e.g., to a user) from outside chamber 22 during inspection of apparatus 10.

Figure 10:
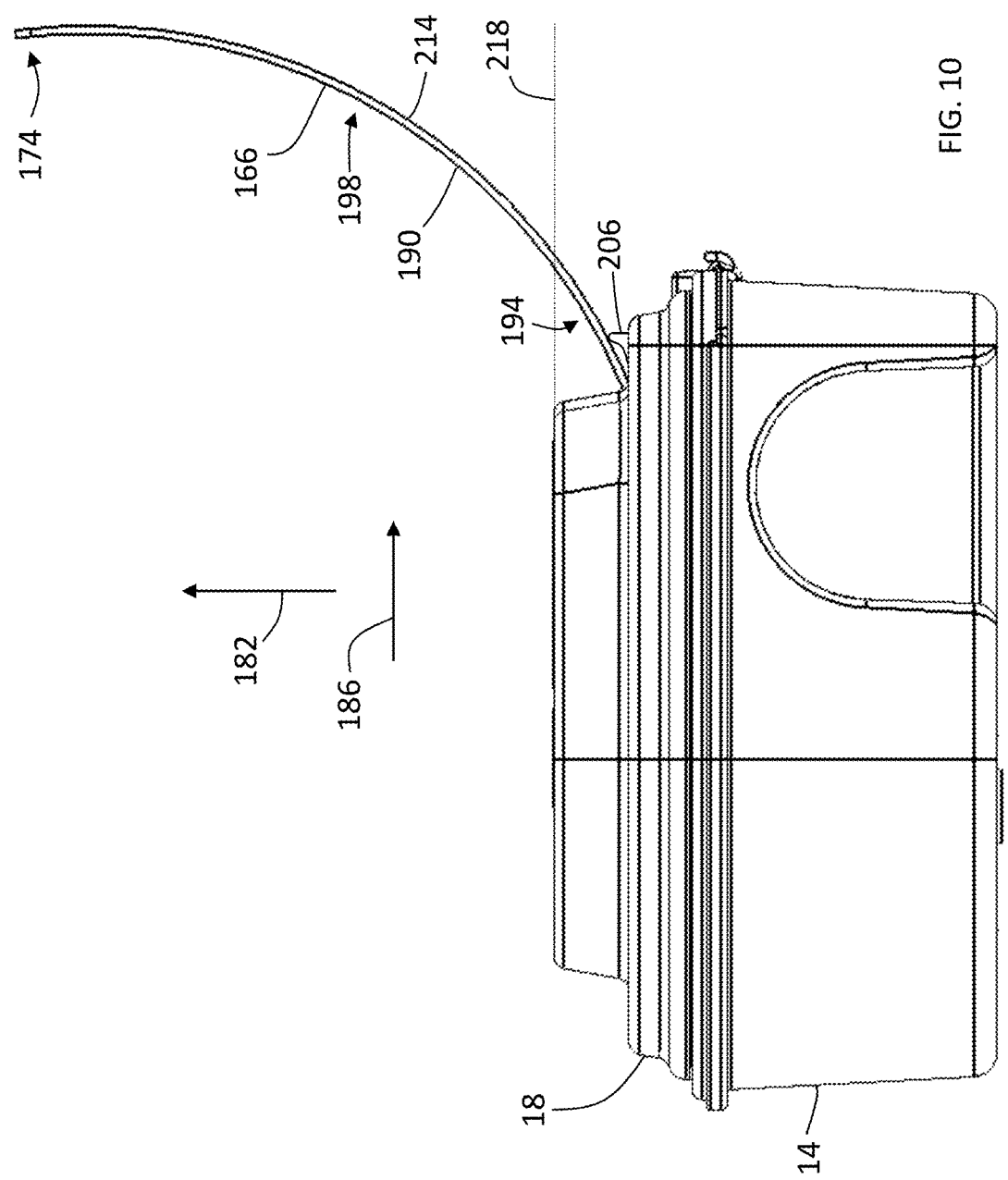
FIGS. 10 and 11 are side and cross-sectional views, respectively, of the pest-management apparatus of FIG. 1, shown with the indicator of FIG. 8 in a first position.
Figure 12:
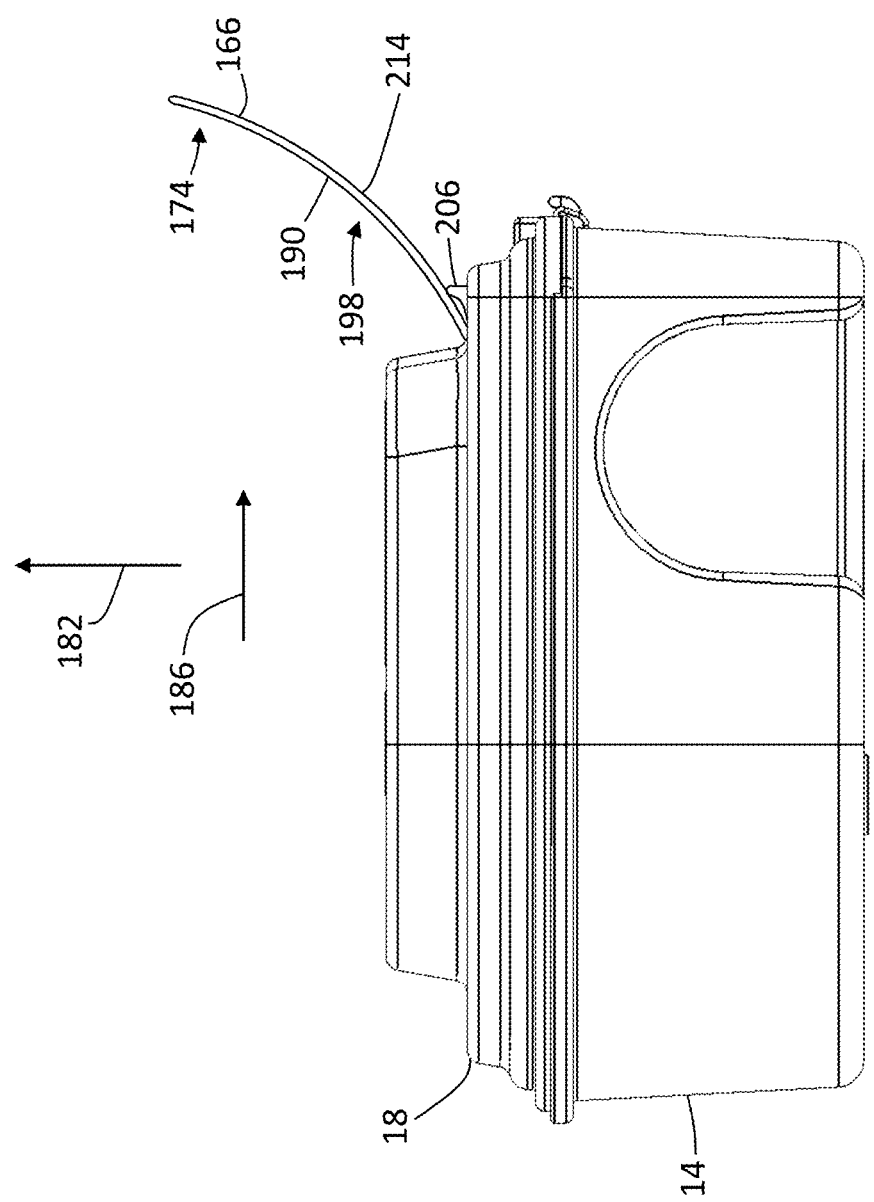
FIG. 12 is a side view of the pest-management apparatus of FIG. 1, shown with the indicator of FIG. 8 in a second position.
Figure 13:
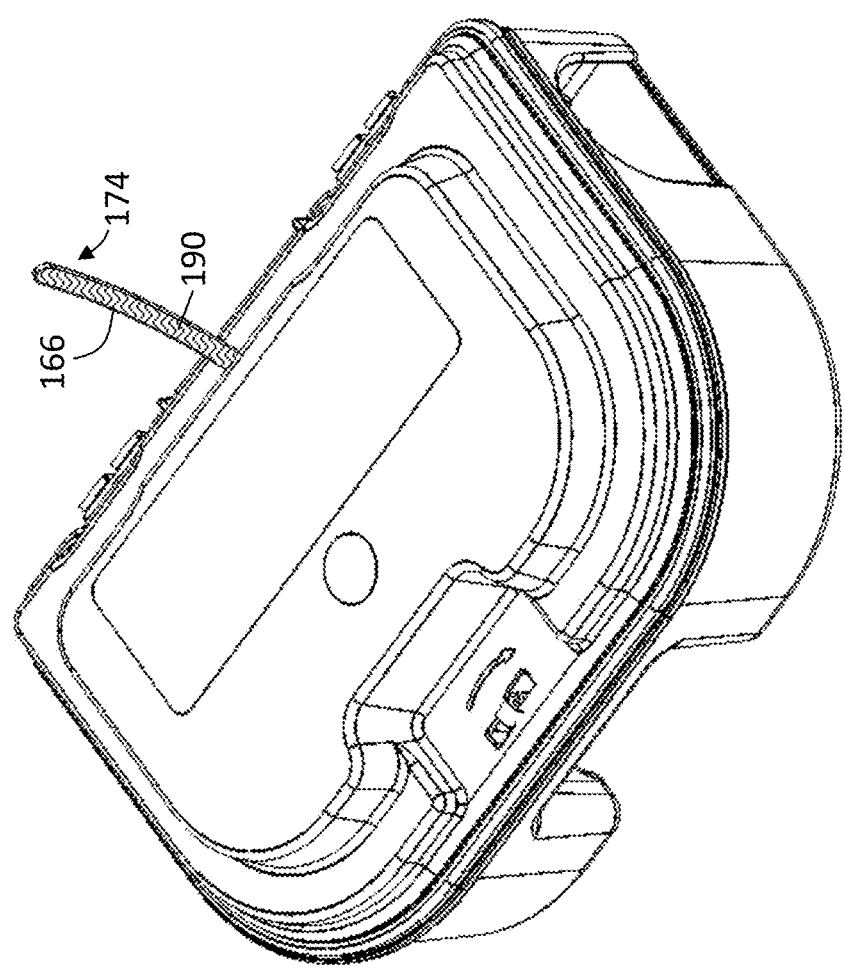
FIG. 13 is a perspective view of the pest-management apparatus of FIG. 1, shown with the indicator of FIG. 8 in the second position.
Figure 14:
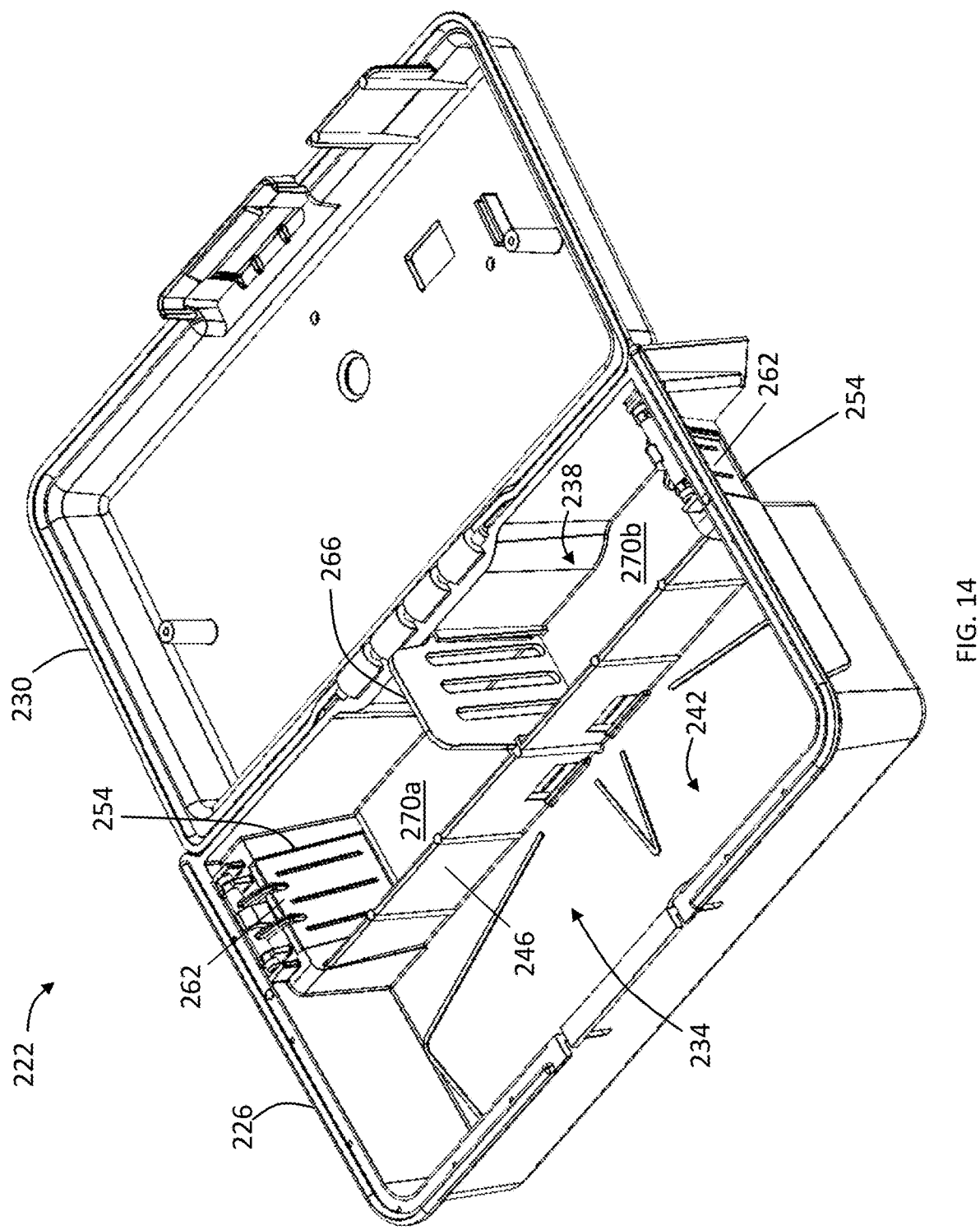
FIG. 14 is a perspective view of another embodiment of the present pest-management apparatuses, shown with some components omitted.

In the depicted embodiment, indicator 166 is configured to be coupled to pest-capture device 126 such that the indicator is movable between a first position and a second position in response to actuation of pest-capture device 126. More particularly, in the embodiment shown, indicator 166 is configured to be coupled to capture element 134 of pest-capture device 126, such that the indicator is movable between the first position and the second position in response to movement of the capture element between the set position and the capture position, respectively. In the embodiment shown, for example in FIGS. 1 and 10, when indicator 166 is in the first position, the indicator (e.g., second end 174) extends above the upper surface of lid 18 (e.g., in a direction generally indicated by arrow 182) and/or beyond an outermost edge of sidewall 26 (e.g., in a direction generally indicated by arrow 186). In this embodiment, when indicator 166 is in the first position, a first portion 194 of the indicator (e.g., upper surface 190 on first portion 194) is at least partially visible (e.g., to a user) from outside of chamber 22, and, when the indicator is in the second position (e.g., FIGS. 12 and 13), at least a majority of the first portion (e.g., the upper surface on the first portion) that was visible in the first position is no longer visible (e.g., to a user) from outside of chamber 22.

In the depicted embodiment, indicator 166 includes a second portion 198 (e.g., upper surface 190 on the second portion), which is at least partially visible (e.g., to a user) from outside of chamber 22 both when the indicator is in the first position and when the indicator is in the second position. In this embodiment, second portion 198 is at least partially visible (e.g., to a user) from outside of chamber 22 when indicator 166 is in the second position. However, in other embodiments, an indicator (e.g., 166) may not be visible from outside of a chamber (e.g., 22) when the indicator is in the second position. In these ways and others, via visual inspection of apparatus 10, a user may ascertain whether capture element 134 is in a set or actuated position, and thus whether pest-capture device 126 is set or has been actuated, respectively.

Upper surface 190 of indicator 166 may be configured to visually indicate actuation of pest-capture device 126. In the depicted embodiment, upper surface 190 of indicator 166 includes one or more colors which are visible (e.g., to a user) from outside of chamber 22 during inspection of pest-capture device 126. For example, upper surface 190 of indicator 166 on first portion 194 includes a first color and the upper surface of the indicator on second portion 198 includes a second color visually distinct from the first color. For illustrative purposes, in the embodiment shown, the first color is schematically represented by a dotted crosshatching and the second color is schematically represented by a horizontal zig-zag crosshatching. In some embodiments, upper surface 190 of indicator 166 on first portion 194 does not include the second color and/or the upper surface of the indicator on second portion 198 does not include the first color. More particularly, in some embodiments, upper surface 190 of indicator 166 on first portion 194 consists of (e.g., exclusively) the first color and/or the upper surface of the indicator on second portion 198 consists of (e.g., exclusively) the second color. The first color and the second color may be selected such that a user is able to visually distinguish between the first color and the second color (e.g., from a distance of at least 2, 3, 5, 10, or 15 feet away from apparatus 10).

When indicator 166 is in the first position, at least a portion of both the first and second colors of upper surface 190 on respective first and second portions 194 and 198 may be visible (e.g., to a user) from outside of chamber 22. After pest-capture device 126 is actuated, thereby moving indicator 166 to the second position, at least a majority of the first color of upper surface 190 on first portion 194 that was visible in the first position is no longer visible (e.g., to the user) from outside of chamber 22. However, the second color of upper surface 190 on second portion 198 remains at least partially visible (e.g., to the user) from outside of chamber 22 when indicator 166 is in the second position. In this embodiment, upon visual inspection of apparatus 10, the user may notice that only the second color of upper surface 190 of indicator 166 is visible, thereby indicating to the user that pest-capture device 126 has been actuated. In other embodiments, upon visual inspection of a pest-management apparatus (e.g., 10), a user may notice that more of the second color is visible than the first color, thereby indicating to the user that a pest-capture device (e.g., 126) has been actuated.

In some embodiments, at least a portion (e.g., at least one of portions 194 and 198) of an indicator (e.g., 166) is reflective. Alternatively, or additionally, at least a portion (e.g., at least one of portions 194 and 198) of an indicator (e.g., 166) includes one or more light emitting diodes (LEDs). For example, in this embodiment, the LEDs of the indicator (e.g., 166) may change in color, intensity, and/or blinking frequency (if applicable), in response to changing the indicator from a first state to a second state.

Figure 9:
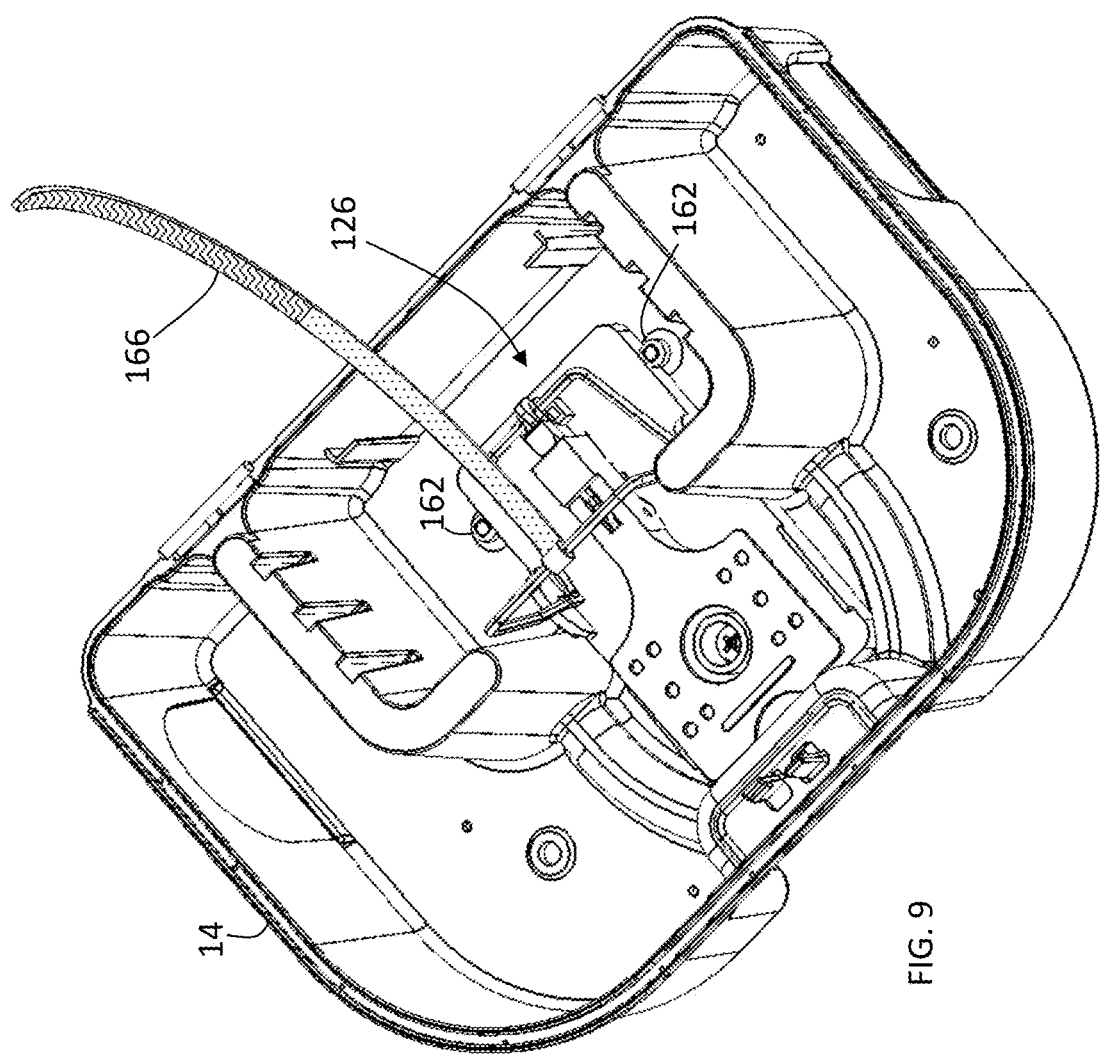
FIG. 9 is a perspective view of the pest-capture device and indicator of FIG. 8 disposed in the base of FIGS. 4-6.
Figure 11:
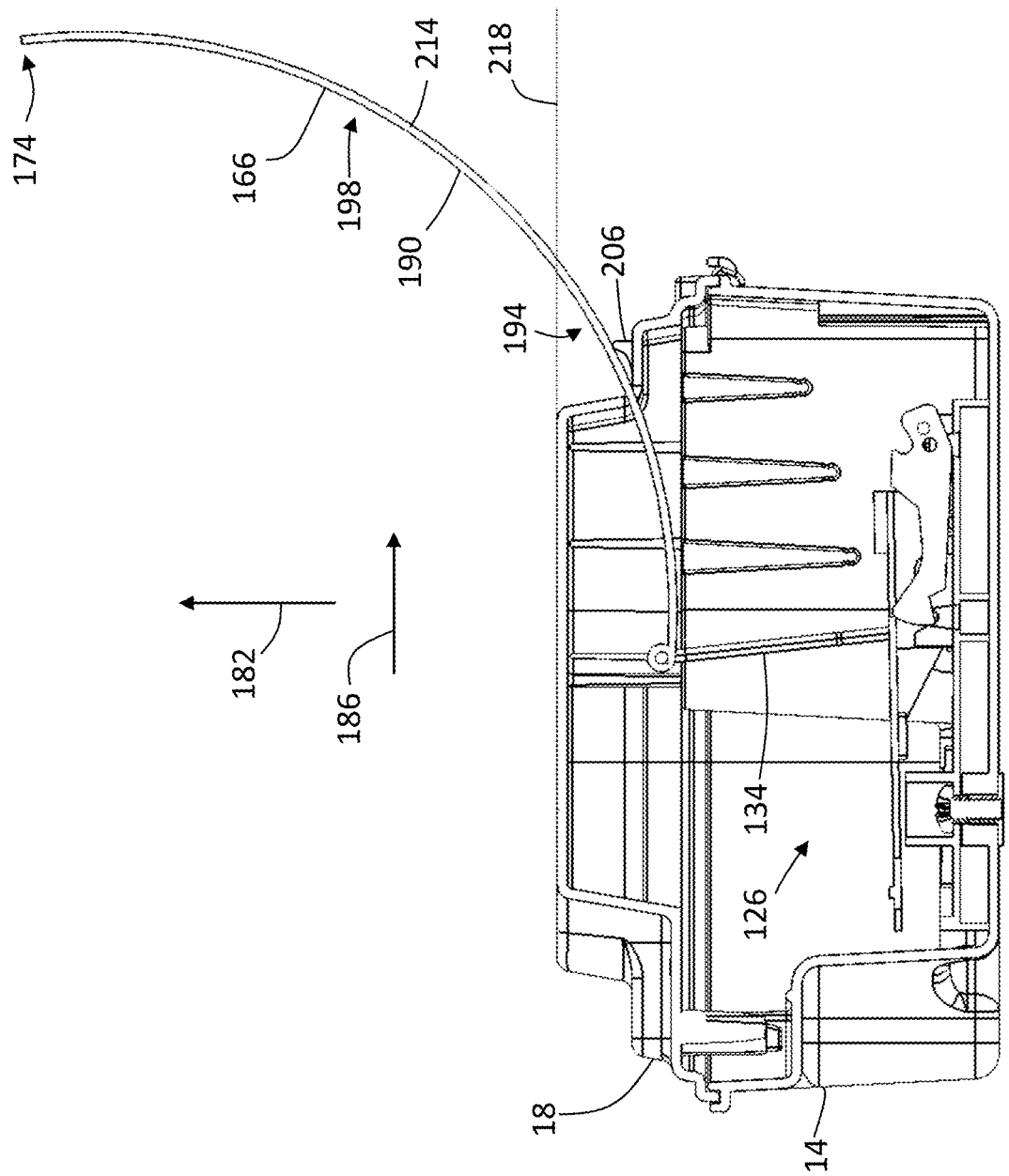

Indicator 166 may be used to set pest-capture device 126 (e.g., change the pest-capture device to the set position after the pest-capture device has been actuated), such as when indicator 166 is in the second position. For example, in the embodiment shown in FIG. 12, when lid 18 is closed and after pest-capture device 126 has been actuated, indicator 166 (e.g., second end 174) extends at least partially through opening 178. More particularly, when indicator 166 is in the second position, the indicator (e.g., second end 174) extends above the upper surface of lid 18 (e.g., in a direction generally indicated by arrow 182) and/or beyond an outermost edge of sidewall 26 (e.g., in a direction generally indicated by arrow 186). A user may move indicator 166 (e.g., via second end 174) away from chamber 22 to set pest-capture device 126. More particularly, a user may pull second end 174 in a first direction (e.g., in a direction generally indicated by arrow 182) perpendicular relative to the upper surface of lid 18, in a second direction (e.g., in a direction generally indicated by arrow 186) parallel relative to floor 50 and away from chamber 22, or any combination of the first direction and the second direction. In turn, first end 170 of indicator 166, which is coupled to pest-capture device 126 (e.g., via capture element 134) causes the capture element to rotate about a hinge 202 from the capture position until the capture element is retained by catch 138, thereby releasably locking the capture element in the set position, as depicted in, for example, FIGS. 8, 9, and 11. Capture element 134 may remain in the set position until pest-capture device 126 is actuated, whereby the capture element moves again into the capture position. In this embodiment, device 10 may be repeatedly set and actuated, thereby successively capturing multiple rodents using pest-capture device 126.

In the depicted embodiment, lid 18 includes a protrusion 206 proximate to opening 178, such as at an edge of the opening closest to interlocking hinge 90. Protrusion 206 may include a portion extending in a direction perpendicular to the upper surface of lid 18 (e.g., in a direction generally indicated by arrow 182). In this embodiment, protrusion 206 includes a sloped and/or curved portion 210 (e.g., concave or convex, including substantially arcuate), at least a portion of which is angularly disposed relative to the outer surface of the one of base 14 and lid 18. In the depicted embodiment, protrusion 206 is configured to engage indicator 166 (e.g., a lower surface 214 of the indicator) when the indicator is in the first position and when the indicator is in second position. However, in other embodiments, a protrusion (e.g., 206) may be configured such that the protrusion does not engage an indicator (e.g., 166) when the indicator is in the second position. In the depicted embodiment, protrusion 206 is configured to support indicator 166, such that the indicator extends upwardly from chamber 22 (e.g., in a direction generally indicated by arrow 182) and/or laterally outward from the chamber (e.g., in a direction generally indicated by arrow 186), thereby increasing the visibility of indicator 166 to a user inspecting apparatus 10 for actuation of pest-capture device 126. In some embodiments, protrusion 206 causes indicator 166 (e.g., second end 174) to extend above a plane 218 defined by the uppermost surface of lid 18 (e.g., when lid 18 is in the closed position), as shown, for example, in FIGS. 10 and 11.

Referring to FIGS. 14-17, shown therein and designated by the reference numeral 222 is another embodiment of the present pest-management apparatuses.

In the embodiment shown, apparatus 222 includes a base 226 and a lid 230 configured to be coupled to the base such that the lid is movable (e.g., and removable) relative to base 226 between an open position (e.g., FIGS. 14 and 15) and a closed position (e.g., FIGS. 16 and 17) in which the base and the lid cooperate to define a chamber 234. In the embodiment shown, chamber 234 may be divided into a first chamber portion 238 (e.g., an entry portion) and a second chamber portion 242 (e.g., a pest capture portion) by a separator 246.

As shown, apparatus 222 may comprise one or more separators 246 (e.g., one separator, as shown) configured to prevent a pest from accessing at least a portion of chamber 234 except by climbing over the one or more separator(s). More specifically, separator 246 may be configured to prevent a pest from traversing from first chamber portion 238 to second chamber portion 242 except by climbing over the separator.

As shown, first chamber portion 238 and second chamber portion 242 are in fluid communication. In the embodiment shown, apparatus 222 may include one or more pest-capture device(s) 126 (as discussed in relation to FIGS. 1-13) (e.g., two pest-capture devices shown), which are disposable within chamber 234 (e.g., second chamber portion 242) and are configured to prevent a pest that is captured by the pest-capture device from exiting the chamber (e.g., the second chamber portion). More particularly, one or more pest-capture device 126 may be arranged in second chamber portion 242 such that, when a rodent traverses separator 246, the rodent lands on trigger 142, thereby actuating the pest-capture device from the set position to the capture position.

In this embodiment, one or more indicator(s) 166 of pest-capture device(s) 126 may be configured to, when in at least one position, extend outside of chamber 234, such as, for example, through a respective opening 250 defined by at least one of base 226 and lid 230 (e.g., by the lid alone, in the depicted embodiment).

Figure 15:
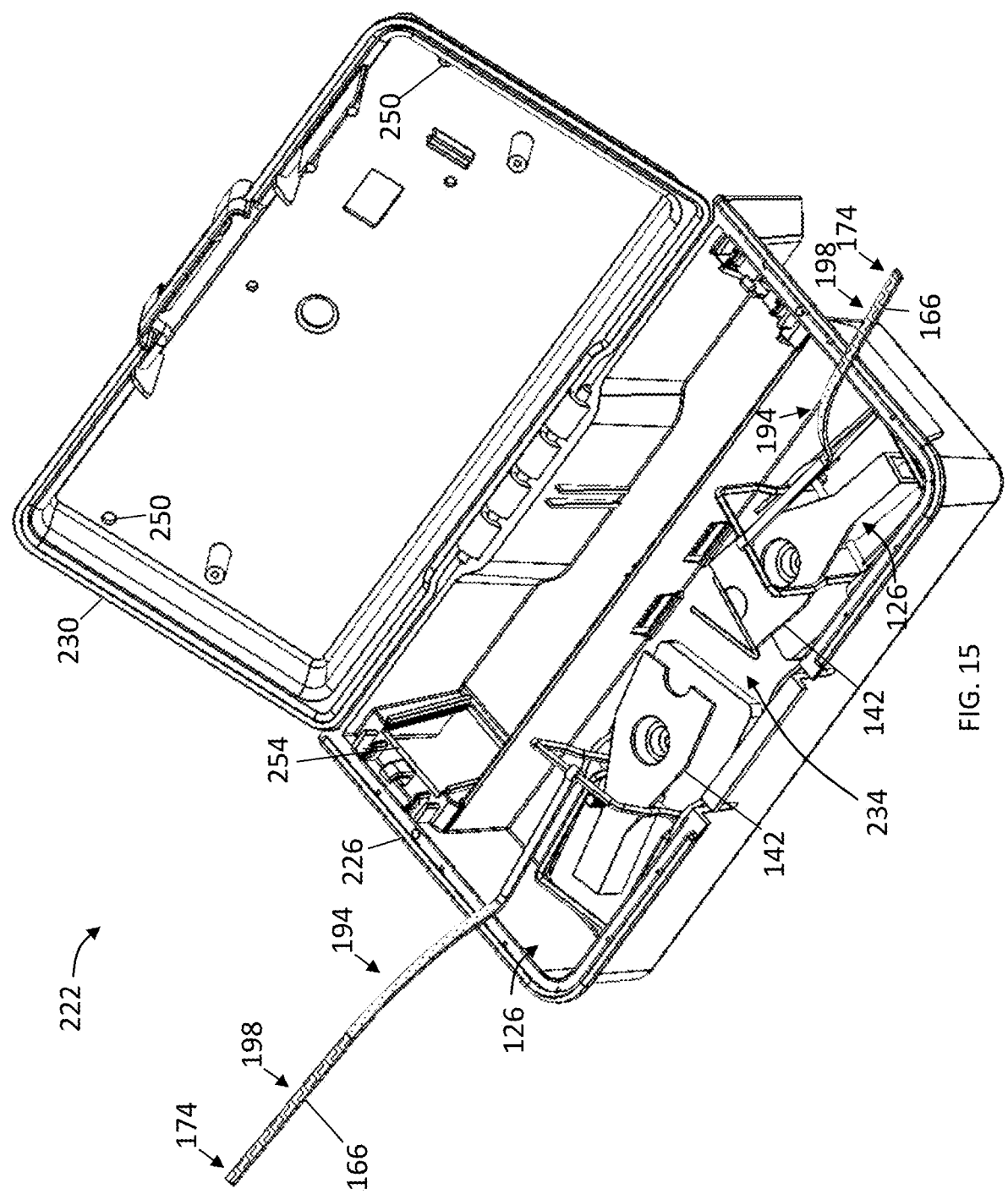
FIG. 15 is a perspective view of the apparatus of FIG. 14, shown with the pest-capture device and the indicator of FIG. 8.
Figure 16:
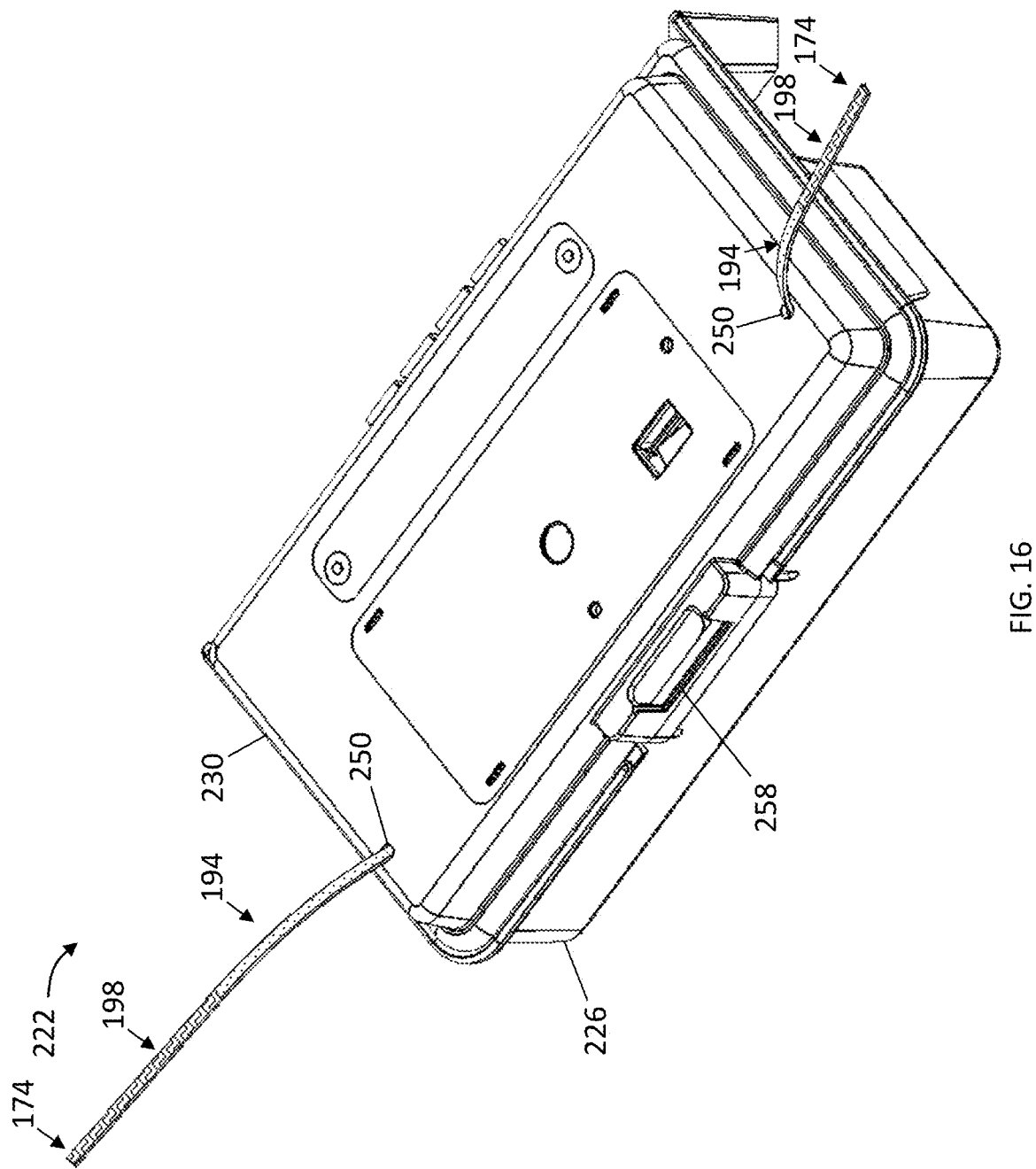
FIGS. 16 and 17 are perspective views of the pest-management apparatus of FIG. 14, shown with a lid in the closed position and the indicator of FIG. 8 in a first and second position, respectively.
Figure 17:
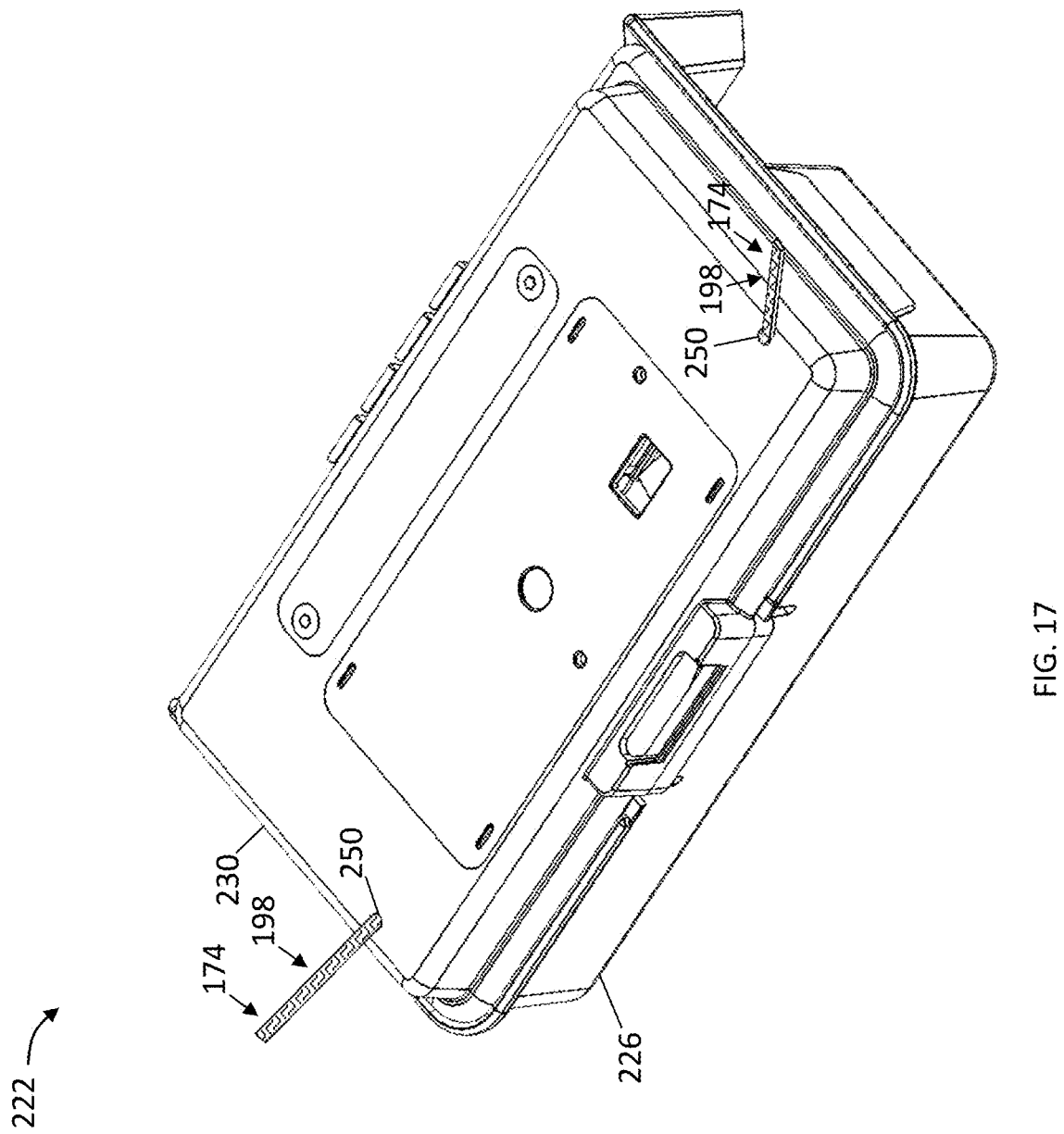
Figure 19:
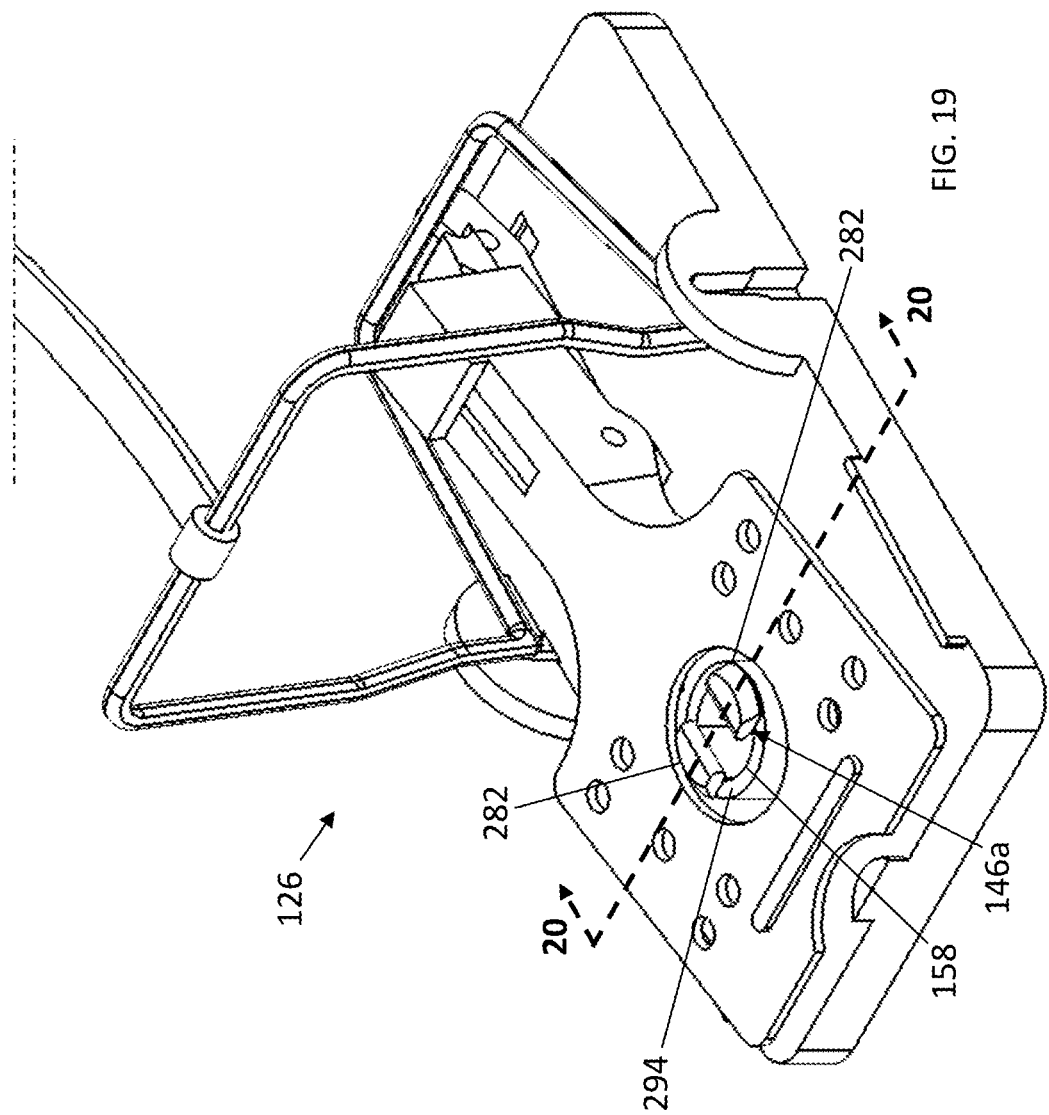
FIG. 19 depicts the fastener of FIGS. 18A-18E and a portion of the pest-capture device of FIG. 8.

In the embodiment shown, for example in FIGS. 15 and 16, when indicator 166 is in the first position, the indicator (e.g., second end 174) extends above an upper surface of lid 230 and/or beyond an outermost edge of base 226. In this embodiment, when indicator 166 is in the first position, first portion 194 of the indicator (e.g., upper surface 190 on first portion 194) is at least partially visible (e.g., to a user) from outside of chamber 234, and, when the indicator is in the second position (e.g., FIG. 17), at least a majority of the first portion (e.g., the upper surface on the first portion) that was visible in the first position is no longer visible (e.g., to a user) from outside of chamber 234. In this embodiment, second portion 198 is at least partially visible (e.g., to a user) from outside of chamber 234 when indicator 166 is in the second position.

In the depicted embodiment, apparatus 222 includes at least one opening 254 (e.g., two openings, as shown), each configured (e.g., sized) to permit a pest exterior to the apparatus to enter chamber 234. In the embodiment shown, each opening 254 may be defined by base 226 alone (e.g., the entire perimeter of the opening is defined by the base). In other embodiments, one or more openings (e.g., 254) may be defined by a lid (e.g., 230) alone or by both a base (e.g., 226) and a lid (e.g., 230), when the lid is in a closed position.

In the depicted embodiment, apparatus 222 (e.g., lid 230) includes one or more openings 258 (e.g., one opening, as shown) configured to allow passage of light into at least a portion of chamber 234 (e.g., second chamber portion 242, in the embodiment shown). More specifically, opening 258 may be configured such that at least a portion of chamber 234 (e.g., second chamber portion 242, in the embodiment shown) is visible from an exterior of the apparatus when lid 230 is in the closed position.

In the depicted embodiment, opening 258 may be configured to receive a viewing window. In this embodiment, at least a portion of the window may include translucent (e.g., transparent) material, such as, for example, glass, plastic, and/or the like, such that at least a portion of chamber 234 (e.g., second chamber portion 242) is visible from an exterior of apparatus 222 when lid 230 is in the closed position. In other embodiments, a viewing window and/or an opening (e.g., 258) may be omitted.

In the embodiment shown, apparatus 222 includes one or more barrier members 262 (e.g., two barrier members, as shown) moveable between an open position, in which the barrier member is configured to permit a pest exterior to the apparatus to enter chamber 234, and a closed position, in which the barrier member is configured to at least partially obstruct a respective opening 254 of the apparatus. In the depicted embodiment, at least a portion of barrier member 262 is configured to be translucent (e.g., transparent). As shown, barrier member 262 may include one or more through-holes. In the depicted embodiment, at least a portion of barrier member 262 may include translucent (e.g., transparent) material, such as, for example, glass, plastic, and/or the like.

In the depicted embodiment, apparatus 222 includes one or more divider(s) 266 (e.g., one divider, as shown) disposed in first chamber portion 238 and configured to divide first chamber portion 238 into first subchamber 270a and second subchamber 270b. As shown, divider 266 is configured to prevent a pest from traversing between first subchamber 270a and second subchamber 270b, such as by entering apparatus 222 through a first respective opening 254 and exiting the apparatus through a second respective opening 254.

In the depicted embodiment, at least a portion of divider 266 is configured to be translucent (e.g., transparent). As shown, divider 266 may include one or more through-holes. In the depicted embodiment, at least a portion of divider 266 may include translucent (e.g., transparent) material, such as, for example, glass, plastic, and/or the like.

Referring to FIGS. 18A-18E, shown therein and designated by the reference numeral 146a is further embodiment of the present fasteners that may be suitable for use in some embodiments of the present pest-management apparatuses. In this embodiment, fastener 146a can be configured to releasably secure a pest-capture device (e.g., 126) to a base 14a (FIG. 20) of an apparatus (e.g., 10) without the use of an implement (e.g., a tool, such as, for example, a screwdriver) to release and/or secure the device to the base of the apparatus.

Figure 20:
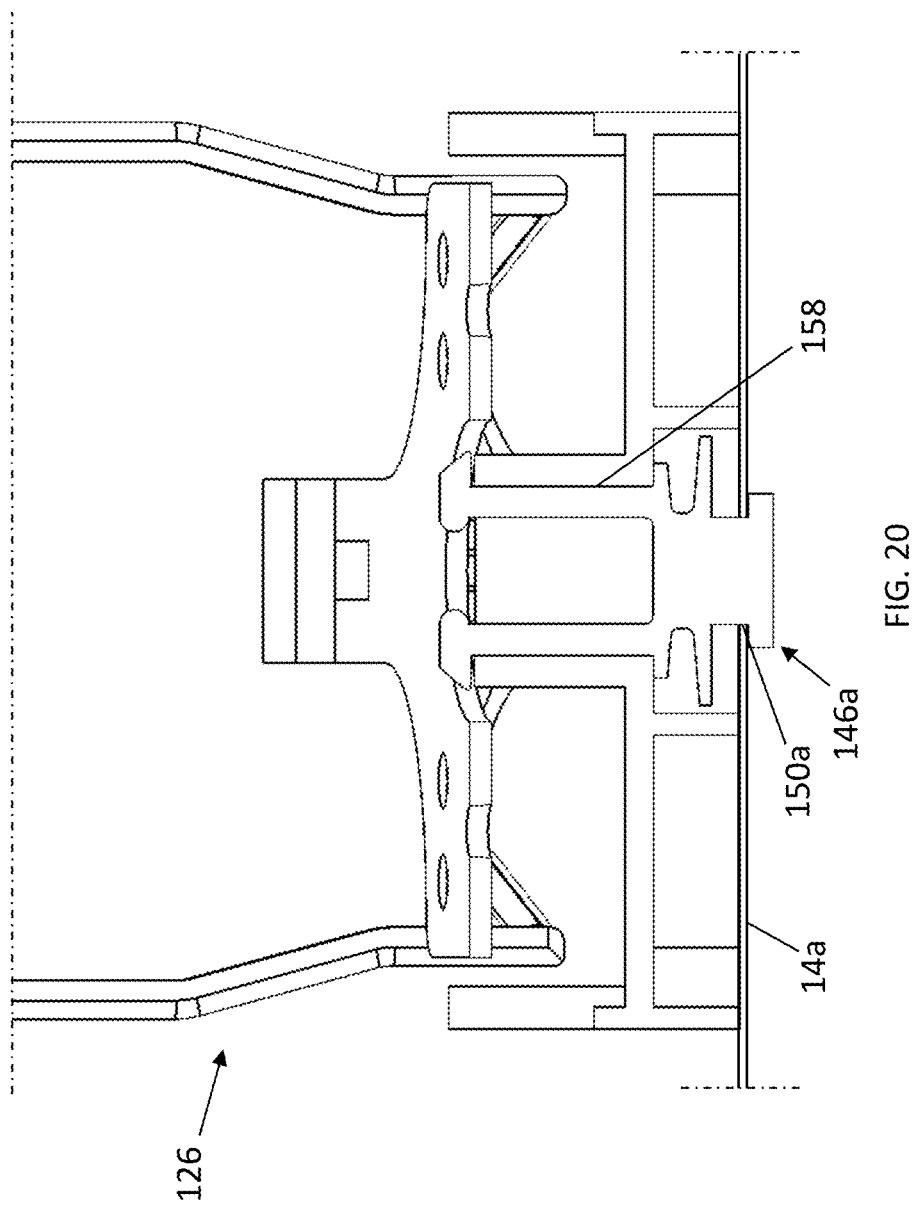
FIG. 20 depicts a cross-sectional view of the fastener of FIGS. 18A-18E and a portion of the pest-capture device of FIG. 8, taken along line 20-20 of FIG. 19.
Figure 21B:
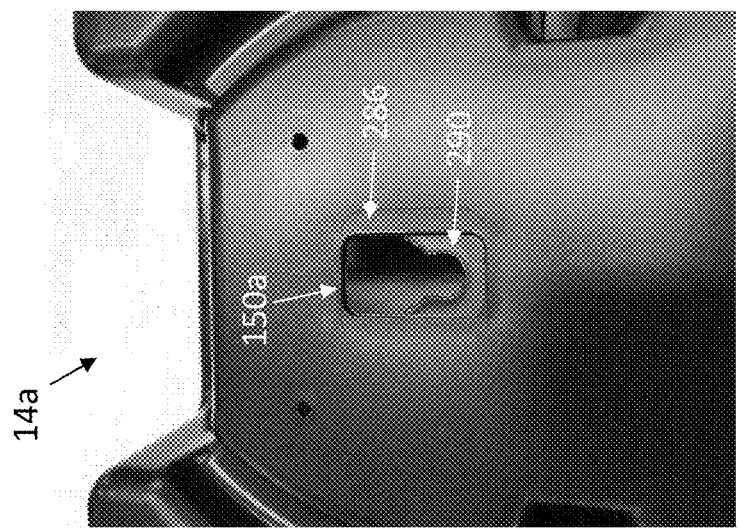
FIGS. 21A and 21B depict top and bottom views, respectively, of a portion of a base suitable for use in some embodiments of the present pest-management apparatuses.
Figure 21A:
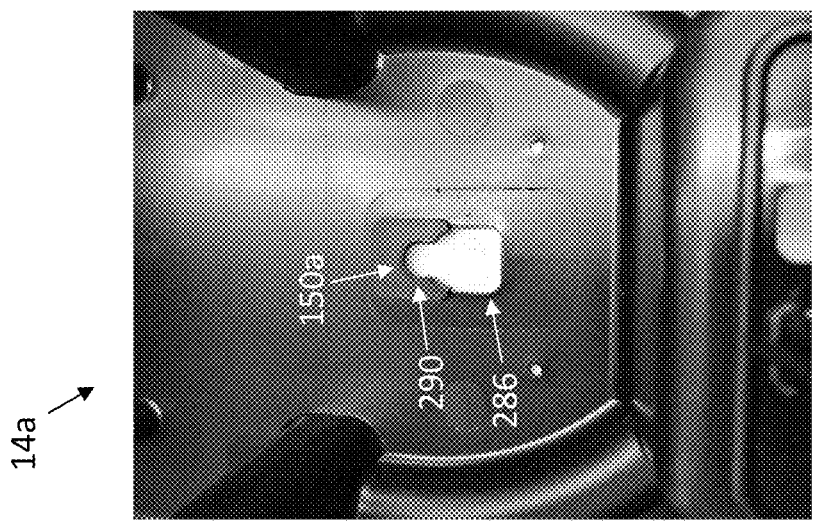

In this embodiment, fastener 146a includes a base 274, a head 276, and a neck 278 extending between the base and the head. As shown in FIG. 18C, head 276 comprises a larger transverse dimension than neck 278. Head 276 can include one or more latching protrusions 282. Fastener 146a can be configured to be received by an opening 150a of base 14a and/or opening 158 of pest-capture device 126. to prevent inadvertent separation of the base and the device. For example, opening 150a of base 14a may comprise a first portion 286 having a first transverse dimension and a second portion 290 having a second transverse dimension, wherein the first dimension is greater than the second dimension and the first dimension is sized to receive head 276 of fastener 146a. Fastener 146a may be movable relative to opening 150a from first portion 286 to second portion 290 such that one or more latching protrusions 282 of the fastener are received by the second portion of the opening, thereby restricting movement of the fastener relative to the opening (e.g., in a direction toward the first portion of the opening and/or in a direction downward and/or out through the opening). In this embodiment, fastener 146a can extend through both opening 150a of base 14a and opening 158 of pest-capture device 126 such that one or more latching protrusions 282 of the fastener can be received by one or more latching protrusions 294 of the pest-capture device (FIG. 20). To release pest-capture device 126 from base 14a, a user can (e.g., with one or more fingers) urge one or more latching protrusions 282 of fastener 146a away from one or more latching protrusions 294 of the pest-capture device, thereby disengaging each of the one or more latching protrusions of the fastener from its corresponding latching protrusion(s) of the pest-capture device, which permits movement of the pest-capture device relative to the base.

The above-described embodiments include the benefit of increased inspection speed and ease by providing a visual indication of the state of a pest-management apparatus (e.g., between a set state and an actuated state). Furthermore, the above-described embodiments include the benefit of easily resetting the pest-management apparatus (e.g., from the actuated state to the set state) while the apparatus remains in a closed position.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A pest-management apparatus comprising:
    a base having a floor defining a first opening and a sidewall that defines an external perimeter of the base;
    a lid coupled to the base such that the lid is movable relative to the base between an open position and a closed position in which the lid and the base cooperate to define a chamber;
    a pest-capture device disposable within the chamber, the pest-capture device having a body defining a second opening and a capture element that is movable relative to the body between a set position and a capture position;

a fastener configured to extend through the first opening and the second opening to couple the pest-capture device to the base, the fastener having:
a first end and a second end having one or more protrusions configured to engage the body;
  a fastener base; and
  a neck extending from the fastener base toward the second end, where the one or more protrusions extend in a direction that is substantially orthogonal to the neck;
  an elongated, resilient indicator having a first end, a second end, and a first portion disposed between the first end and the second end;
  where the first end of the indicator is configured to be coupled to the capture element of the pest-capture device such that:
the indicator extends through and is movable relative to the lid;
  if the lid is in the closed position and the capture element is in the set position, the first portion of the indicator is visible from outside of the chamber and the second end of the indicator extends above the lid and laterally beyond the external perimeter of the base; and
  if the lid is in the closed position and the capture element is in the capture position, at least a majority of the first portion of the indicator is not visible from outside of the chamber; and
  where the second end of the fastener is moveable between an engaged position and a released position.

2. The apparatus of claim 1, where:
while the fastener is in the released position, the second end of the fastener has a first transverse dimension;
while the fastener is in the engaged position, the second end of the fastener has a second transverse dimension that is greater than the first transverse dimension; and
the pest-capture device is removable from the base, while the fastener is in the released position.

3. The apparatus of claim 1, where:
the indicator includes a second portion adjacent to the first portion and disposed between the first portion and the second end; and
an upper surface of the indicator on the first portion includes a first color and the upper surface of the indicator on the second portion includes a second color that is visually distinct from the first color.

4. The apparatus of claim 1, where:
the body includes one or more latching protrusions; and
the one or more protrusions of the fastener engage the one or more latching protrusions while the fastener couples the pest-capture device to the base.

5. The apparatus of claim 1, further comprising:
a separator;
a divider; and
at least one barrier member.

6. The apparatus of claim 1, where the lid comprises an opening configured to allow passage of light into at least a portion of the chamber.

7. The apparatus of claim 1, where the apparatus is configured such that movement of the indicator from a first position to a second position moves the capture element from the capture position to the set position.

8. The apparatus of claim 1, where the pest-capture device comprises a snap trap.

9. The apparatus of claim 1, where the capture element is biased toward the capture position.

10. A pest-management apparatus comprising:
a base having a floor that defines a first opening and a sidewall that defines an external perimeter of the base;
a lid coupled to the base such that the lid is movable relative to the base between an open position and a closed position in which the lid and the base cooperate to define a chamber;
a pest-capture device disposable within the chamber, the pest-capture device having a body and a capture element that is movable relative to the body between a set position and a capture position, the body having a latching protrusion that defines a second opening;
a fastener configured to extend through the first opening and the second opening to couple the pest-capture device to the base, the fastener having one or more protrusions configured to engage the latching protrusion of the body; and
an elongated, resilient indicator having a first end, a second end, a first portion disposed between the first end and the second end, and a second portion adjacent to the first portion and disposed between the first portion and the second end, where an upper surface of the indicator on the first portion includes a first color and the upper surface of the indicator on the second portion includes a second color that is visually distinct from the first color;
where the first end of the indicator is configured to be coupled to the capture element of the pest-capture device such that:
the indicator extends through and is movable relative to the lid;
  if the lid is in the closed position and the capture element is in the set position, the first portion of the indicator is visible from outside of the chamber;
  and if the lid is in the closed position and the capture element is in the capture position, at least a majority of the first portion of the indicator is not visible from outside of the chamber; and
where the fastener extends from a first end to a second end and includes:
  a fastener base nearer the first end than the second end; and
  a neck extending from the fastener base toward the second end, the neck including a plurality of posts, each post extending between the first and second end and having a respective one of the one or more protrusions extending in a direction that is substantially orthogonal to the post at the second end.

11. The apparatus of claim 10, where, while the pest-capture device is coupled to the base, each post is moveable between:
an engaged position in which the respective protrusion engages a portion of the latching protrusion
and a released position in which the respective protrusion does not engage a portion of the latching protrusion.

12. The apparatus of claim 11, where the plurality of posts are moveable toward one another to move from the engaged position to the released position.

13. The apparatus of claim 10, where the one or more protrusions of the fastener comprise:
a first protrusion disposed at a first end of the fastener and configured to engage the floor; and
a plurality of second protrusions disposed at a second end of the fastener and configured to engage the latching protrusion.

14. The apparatus of claim 13, where, while the pest-capture device is coupled to the base, the plurality of second protrusions are moveable relative to one another to engage or disengage the latching protrusion.

15. The apparatus of claim 13, where the one or more protrusions of the fastener comprise a third protrusion disposed between the first and second end of the fastener and configured to engage the floor, the third protrusion having a transverse dimension that is greater than transverse dimension of the fastener at the first or second ends.

16. The apparatus of claim 13, where each of the plurality of second protrusions are coupled to a post extending between the first and second end of the fastener.

17. The apparatus of claim 13, where the first opening includes:
- a first portion having a first transverse dimension; and
- a second portion having a second transverse dimension; and
- the first transverse dimension is greater than the second transverse dimension and the first transverse dimension is sized to receive the second end of the fastener.

* * * * *